United States Patent
Nakashima

(10) Patent No.: US 6,441,506 B2
(45) Date of Patent: Aug. 27, 2002

(54) PARALLEL HYBRID VEHICLE EMPLOYING PARALLEL HYBRID SYSTEM, USING BOTH INTERNAL COMBUSTION ENGINE AND ELECTRIC MOTOR GENERATOR FOR PROPULSION

(75) Inventor: Kenji Nakashima, Shizuoka (JP)

(73) Assignee: Jatco Transtechnology Ltd., Fuji (JP)

( * ) Notice: Subject to any disclaimer, the term of this patent is extended or adjusted under 35 U.S.C. 154(b) by 37 days.

(21) Appl. No.: 09/766,836

(22) Filed: Jan. 23, 2001

(30) Foreign Application Priority Data

Mar. 7, 2000 (JP) ........................... 2000-062461

(51) Int. Cl.7 ............................................... B60L 11/12
(52) U.S. Cl. ................ 290/40 C; 180/65.2; 123/179.1; 318/139
(58) Field of Search ............................ 290/17, 40 R, 290/41, 40 C; 318/139; 180/65.2; 123/179.1

(56) References Cited

U.S. PATENT DOCUMENTS

| | | | | |
|---|---|---|---|---|
| 5,786,640 A | * | 7/1998 | Sakai et al. ............... | 180/65.2 |
| 5,865,263 A | * | 2/1999 | Yamaguchi et al. ....... | 180/65.2 |
| 5,982,045 A | * | 11/1999 | Tabata et al. ............. | 290/17 |
| 6,253,127 B1 | * | 6/2001 | Itoyama et al. ........... | 123/179.1 |
| 6,253,137 B1 | * | 6/2001 | Abo et al. ................. | 180/367 |
| 6,335,574 B1 | * | 1/2002 | Ochiai et al. ............. | 290/17 |
| 6,373,206 B1 | * | 4/2002 | Morimoto et al. ........ | 123/179.1 |
| 2002/0007975 A1 | * | 1/2002 | Naito et al. ............... | 180/65.3 |
| 2002/0019687 A1 | * | 2/2002 | Suzuki et al. ............. | 701/22 |

FOREIGN PATENT DOCUMENTS

JP         10-304513         11/1998

* cited by examiner

Primary Examiner—Nicholas Ponomarenko
(74) Attorney, Agent, or Firm—Foley & Lardner

(57) ABSTRACT

In a parallel hybrid vehicle employing a parallel hybrid system, using both an internal combustion engine and an electric motor generator for propulsion, a desired motor/generator torque is map-retrieved based on both the engine speed and throttle opening from a predetermined characteristic map in a fashion of feedforward processing. The signal indicative of the desired motor/generator torque is subjected to a low-pass filter that passes signals included in a frequency band lower than an oscillation frequency of powertrain torsional vibrations to remove the powertrain vibration frequency components. The map is preprogrammed so that the desired motor/generator torque is set at zero in a specified speed range lower than an engine idle speed. In another specified speed range from the engine idle speed to a predetermined direct-coupling engine speed that permits the motor/generator to be directly coupled with the engine, a gain of the desired motor/generator torque is set to increase with an increase in the engine speed. In a specified speed range above the predetermined direct-coupling engine speed, the motor/generator is coupled directly with the engine, so that the motor/generator torque output produced from the motor/generator is substantially identical to the engine torque output.

20 Claims, 11 Drawing Sheets

PARALLEL HYBRID VEHICLE EMPLOYING PARALLEL HYBRID SYSTEM, USING BOTH INTERNAL COMBUSTION ENGINE AND ELECTRIC MOTOR GENERATOR FOR PROPULSION

TECHNICAL FIELD

The present invention relates to a parallel hybrid vehicle employing a parallel hybrid system, using both an internal combustion engine and an electric motor/generator as a propelling power source, and specifically to such a parallel hybrid vehicle which is capable of producing a driving torque by means of at least one of the engine and the motor/generator by transmitting a combined torque of an output torque produced from the engine and an output torque produced from the motor/generator via a torque composition mechanism having a planetary gear mechanism to a transmission.

BACKGROUND ART

In recent years, there have been proposed and developed various parallel hybrid vehicles. One such parallel hybrid vehicle has been disclosed in Japanese Patent Provisional Publication No. 10-304513. In the parallel hybrid vehicle disclosed in the Japanese Patent Provisional Publication No. 10-304513, torque output produced from an internal combustion engine and torque output produced from a motor generator are combined into a combined torque output by means of a torque composition mechanism having a planetary gear mechanism or a planetary geartrain. The combined torque output is transmitted via a transmission to drive wheels. During early stages of the starting period of such a parallel hybrid vehicle, the parallel hybrid system usually operates to produce torque output by the motor/generator in a manner so as to bring the motor/generator speed closer to the engine speed, while suppressing a rise in the engine speed. As soon as the motor/generator speed reaches a value substantially corresponding to the engine speed, the engine and the electric motor/generator are directly coupled with each other via a direct-coupling clutch. After this, except for a drop in the vehicle speed, the parallel hybrid system operates to produce driving force (driving torque) by only the engine or by both the engine and the motor/generator. Generally, the torque output of the motor/generator is controlled or regulated responsively to a throttle opening of a throttle valve as well as engine speed. That is to say, engine torque output generated by the engine is estimated by the throttle opening and engine speed. In order to achieve the estimated engine torque, the rotational speed and torque output of the motor/generator are automatically controlled. For example, when an electronic control unit incorporated in the parallel hybrid system determines the hybrid vehicle is in a starting state, the parallel hybrid system sets the engine speed to a desired speed, and then outputs a signal indicative of the difference between the actual engine speed and the desired speed to a PID controller (i.e., a proportional-plus-integral-plus-derivative controller). The output signal value of the PID controller is used as a torque command signal value for the motor/generator, and thus the engine speed is brought closer to the desired speed by way of feedback control.

SUMMARY OF THE INVENTION

The previously-noted parallel hybrid vehicle employing a torque composition mechanism having a planetary gear mechanism, has a so-called torque-multiplication function which is realized by a ratio of the number of teeth of a sun gear to the number of teeth of a ring gear. The torque-multiplication function based on the gear ratio of sun gear to ring gear eliminates the necessity of a torque converter which is generally disposed in a power train. However, if a fluid coupling such as a torque converter does not exist in a power train, there is an increased tendency for undesired torsional vibrations to occur in the power train. In the presence of the fluid coupling (torque converter), fluid (oil) acts to effectively absorb such torsional vibrations. From the viewpoint of reduced powertrain vibrations, the use of a torque converter is advantageous, because of a smooth, vibrationless coupling function of the torque converter. On the other hand, from the viewpoint of fuel consumption, the torque converter is inferior to a planetary gear mechanism, because of energy loss of the fluid coupling (torque converter). Assuming that the engine speed also oscillates owing to undesired powertrain torsional vibrations, there is a possibility of undesirable hunting of the feedback control system for engine speed control. This may exert a bad influence on the motor/generator speed control and motor/generator torque control. To avoid this, it is possible to reduce a gain of the PID controller. As a matter of course, such a reduced gain causes a response delay of the motor/generator. As a result, the engine speed tends to rise, and simultaneously a required output torque value of the motor/generator may become larger. This undesiredly increases the car-battery capacity as well as the motor/generator size, thereby increasing a total weight of the system, and resulting in increased system production costs.

Accordingly, it is an object of the invention to provide a hybrid vehicle employing a parallel hybrid system, which avoids the aforementioned disadvantages.

It is another object of the invention to provide a parallel hybrid vehicle, in which a motor/generator can be brought into direct-coupling state with respect to an internal combustion engine by quickly smoothly driving the motor/generator, while suppressing a rise in engine speed during starting of the hybrid vehicle, and which is capable of realizing down-sizing and lightening of the motor/generator and battery, and of reducing production costs of the system.

In order to accomplish the aforementioned and other objects of the present invention, a parallel hybrid vehicle employing a parallel hybrid system, using both an internal combustion engine and an electric motor generator for propulsion, the parallel hybrid vehicle comprises a torque composition mechanism which combines a torque output produced by the engine and a torque output produced by the motor generator to generate a combined torque, and which is connected via a transmission in a powertrain to drive wheels to output the combined torque via the transmission to the drive wheels, a direct-coupling clutch which directly couples the engine with the motor generator, an engine-speed sensor which detects engine speed of the engine, a throttle opening sensor which detects a throttle opening of a throttle valve, a controller being connected electrically to the motor generator and the direct-coupling clutch for controlling the torque output produced by the motor generator and engagement and disengagement of the direct-coupling clutch, said controller allowing the direct-coupling clutch to operate in a disengaged state and allowing the engine speed to be maintained at a predetermined value during starting of the vehicle, the controller comprising a desired motor/generator torque setting section which sets a desired motor/generator torque on the basis of both the engine speed and the throttle opening from a predetermined characteristic map to generate a signal indicative of the desired motor/generator torque, and a response-characteristic compensation section which attenuates high-input-frequency components and passes low-input-frequency components, out of the signal indicative of the desired motor/generator torque set through the desired motor/generator torque setting section, to generate a compensated signal. The controller controls the torque output of the motor generator on the basis of a signal value of the compensated signal generated by the response-characteristic compensation section.

According to another aspect of the invention, a parallel hybrid vehicle employing a parallel hybrid system, using both an internal combustion engine and an electric motor generator for propulsion, the parallel hybrid vehicle comprises a torque composition means including a differential system for combining a torque output produced by the engine and a torque output produced by the motor generator to generate a combined torque, the torque composition means connected via a transmission in a powertrain to drive wheels for outputting the combined torque via the transmission to the drive wheels, a direct-coupling clutch which directly couples the engine with the motor generator, an engine-speed sensor means for detecting engine speed of the engine, a throttle opening sensor means for detecting a throttle opening of a throttle valve, a torque control means connected electrically to the motor generator and the direct-coupling clutch for controlling the torque output produced by the motor generator and engagement and disengagement of the direct-coupling clutch, the torque control means allowing the direct-coupling clutch to operate in a disengaged state and allowing the engine speed to be maintained at a predetermined value and allowing the direct-coupling clutch to engage at a timing when the engine speed synchronizes a rotational speed of the motor generator during starting of the vehicle, the torque control means comprising a desired motor/generator torque setting means for setting a desired motor/generator torque on the basis of both the engine speed and the throttle opening from a predetermined characteristic map to generate a signal indicative of the desired motor/generator torque, and a response-characteristic compensating means for attenuating high-input-frequency components and for passing low-input-frequency components, out of the signal indicative of the desired motor/generator torque set through the desired motor/generator torque setting means, to generate a compensated signal, and the torque control means controlling the torque output of the motor generator on the basis of a signal value of the compensated signal generated by the response-characteristic compensating means.

According to a further aspect of the invention, an electronic control method for a parallel hybrid vehicle employing a parallel hybrid system, using both an internal combustion engine and an electric motor generator for propulsion and including a direct-coupling clutch directly coupling the engine with the motor generator, and an engine-braking clutch incorporated in a transmission in a powertrain, the electronic control method comprises detecting a throttle opening of a throttle valve, calculating an average throttle opening as a time mean of the throttle opening, detecting engine speed of the engine, calculating an average engine speed as a time mean of the engine speed, retrieving a desired motor/generator torque of the motor generator on the basis of the average throttle opening and the average engine speed from a predetermined characteristic map to produce a signal indicative of the desired motor/generator torque, calculating an average desired motor/generator torque as a time mean of the desired motor/generator torque, detecting a reduction ratio of the transmission in the powertrain, detecting input information regarding which state the direct-coupling clutch is in, detecting input information regarding which state the engine-braking clutch is in, selecting a response-characteristic-compensator frequency characteristic responsively to the reduction ratio of the transmission, the input information regarding which state the direct-coupling clutch is in, and the input information regarding which state the engine-braking clutch is in, making a response-characteristic compensating process of the selected response-characteristic-compensator frequency characteristic to the signal indicative of the average desired motor/generator torque to generate a compensated motor/generator torque command, and controlling the motor generator in response to the compensated motor/generator torque command. The response-characteristic-compensator frequency characteristic may be set at a higher level with a decrease in the reduction ratio of the transmission. The response-characteristic-compensator frequency characteristic may be set at a higher level in presence of a transition from an engaged state of the engine-braking clutch to a disengaged state and set a lower level in presence of a transition from the disengaged state of the engine-braking clutch to the engaged state. The response-characteristic-compensator frequency characteristic may be set at a higher level in presence of a transition from an engaged state of the direct-coupling clutch to a disengaged state and set at a lower level in presence of a transition from the disengaged state of the direct-coupling clutch to the engaged state.

The other objects and features of this invention will become understood from the following description with reference to the accompanying drawings.

DESCRIPTION OF THE PREFERRED EMBODIMENTS

Figure 1:
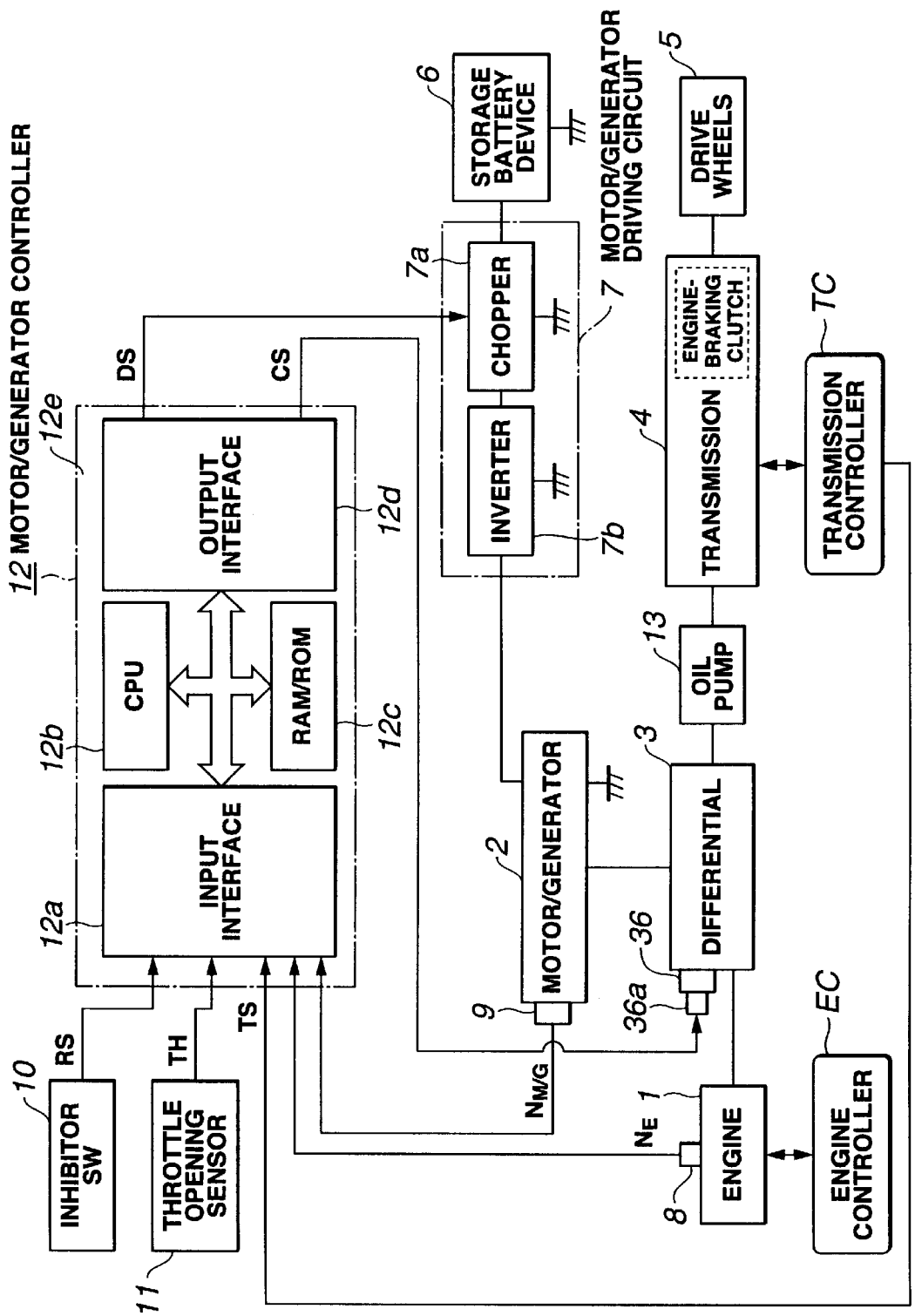
FIG. 1 is a system block diagram showing one embodiment of a parallel hybrid system of a hybrid vehicle of the invention.
Figure 2:
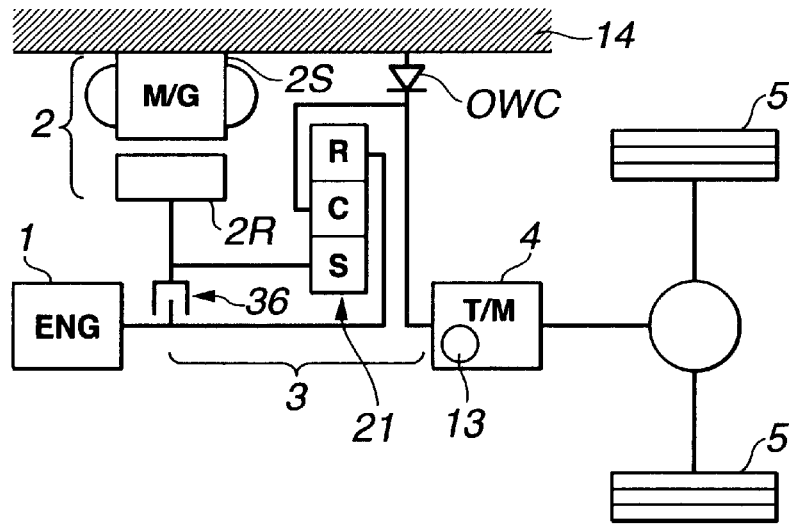
FIG. 2 is a schematic diagram showing one example of a differential arrangement incorporated in the parallel hybrid vehicle shown in FIG. 1.

Referring now to the drawings, particularly to FIG. 1, there is shown a system layout of the parallel hybrid vehicle of the embodiment. As shown in FIG. 1, the parallel hybrid system of the hybrid vehicle employs both an internal combustion engine 1 and an electric motor generator (simply, a motor/generator) 2 as a propelling power source. The motor/generator 2 serves as an electric motor as well as a generator. In the shown embodiment, the motor/generator 2 is constructed by a three-phase induction motor/generator (or a three-phase alternating current motor/generator) which serves as an electric propelling power source. The output shaft of the engine 1 and the output shaft of the motor/generator 2 are both connected to the input side of a differential arrangement or a differential system 3. Differential system 3 has a direct-coupling clutch 36 via which the engine and the motor/generator are coupled with each other. The output side of the differential system 3 is connected to the input side of a transmission 4 which does not have a torque converter serving as a starting device. The output side of the transmission 4 is connected via a final reduction gear (not shown) to drive wheels 5. In the parallel hybrid system of the embodiment, an oil pump 13 is disposed between the differential system 3 and the transmission 4. Pressurized oil (properly regulated hydraulic pressure) produced by the oil pump 13 is supplied via a hydraulic pressure line (not numbered) to the differential system 3 in order to engage or disengage the direct-coupling clutch 36 of differential system 3. Additionally, the hydraulic pressure produced by the oil pump 13 is supplied via a hydraulic pressure line (not numbered) to the transmission 4 in order for the speed-change ratio of the transmission to be varied and for lubrication. The engine 1 is controlled by means of an engine controller EC. As can be seen from FIGS. 1 and 2, the motor/generator 2 has a stator 2S and a rotor 2R. The motor/generator 2 is driven and controlled by means of a motor/generator driving circuit 7. Motor/generator driving circuit 7 is also connected to a storage battery device 6 which is comprised of a rechargeable car battery and capacitors. The motor/generator driving circuit 7 is comprised of a chopper 7a and an inverter 7b. Chopper 7a is electrically connected to the storage battery device 6. The inverter 7b is connected between the motor/generator 2 and the chopper 7a. In the system of the embodiment, the inverter 7b has six thyristors for converting direct current into three-phase alternating current. A duty cycle control signal DS from a motor/generator controller 12, which will be fully described later, is input into the chopper 7a, for outputting a chopper signal corresponding to a duty cycle value (a duty ratio) of the duty cycle control signal DS into the inverter 7b. The inverter 7b is responsive to a position sensor signal from a rotor position sensor (not shown), so that the motor/generator 2 operates as an electric motor when the motor/generator 2 is rotating in its normal-rotation direction, and so that the motor/generator 2 operates as a generator when the motor/generator is rotating in its reverse-rotation direction. The rotor position sensor is located near the rotor 2R for monitoring or detecting a rotational position of the motor/generator rotor 2R. To produce three-phase alternating current which is driven at a synchronizing frequency which is exactly proportional to the rotational motion of motor/generator 2, the inverter 7b produces a gate control signal for each of six thyristors. As discussed above, the motor/generator 2 incorporated in the parallel hybrid system of the embodiment also functions as a propelling power source (a propulsion motor) for vehicle propulsion in the same manner as the engine 1. In the shown embodiment, the normal-rotation direction of motor/generator 2 means a direction of rotation that produces positive wheel torque (driving torque) for vehicle propulsion. As shown in FIG. 2, the differential system 3 has a planetary gear mechanism or a planetary gear system 21 which serves as a torque composition mechanism. Planetary gear system 21 is operatively disposed between the engine 1 and the motor/generator 2 for combining torque output generated by the engine with torque output generated by the motor/generator. Planetary gear system 21 is comprised of a sun gear S, a plurality of circumferentially equi-distant spaced planet pinions P (not shown) being meshed-engagement with the sun gears, a planet-pinion carrier C which is mounted on a shaft so that the shaft can rotate and carry the planet pinions P, and a ring gear (an internal gear) R which inner toothed portion is meshed-engagement with the pinions P. The ring gear R of planetary gear system 21 is connected to the output shaft of engine 1, whereas the sun gear S of planetary gear system 21 is connected to the rotor 2R of motor/generator 2. Also, the planet-pinion carrier C of planetary gear system 21 is connected to the input shaft of the transmission 4. The direct-coupling clutch 36 is disposed between the sun gear S of planetary gear system 21 (or the rotor 2R of motor/generator 2) and the output shaft of engine 1, for engagement/disengagement between them. A one-way clutch OWC is disposed between the planet-pinion carrier C of planetary gear system 21 (or the transmission input shaft) and a differential case 14, to allow rotational motion of the planet-pinion carrier C and rotational motion of the transmission input shaft in their normal-rotation directions and to prevent the carrier C and the transmission input shaft from rotating in their reverse-rotation directions. The previously-noted direct-coupling clutch 36 is comprised of an electromagnetically-driven wet multiple disk clutch. The clutch 36 has a solenoid valve with an electromagnetic solenoid 36a for supplying and releasing the line pressure to and from a cylinder portion (a cylindrical pressure chamber of the clutch). When a clutch control signal CS supplied to the electromagnetic solenoid 36a is a low level, the ring gear R of planetary gear system 21 (or the engine 1) is disengaged from the input shaft of transmission 4 with the clutch 36 disengaged. Conversely, when the control signal CS supplied to the electromagnetic solenoid 36a is a high level, the ring gear R of planetary gear system 21 (or the engine 1) is engaged with the transmission input shaft with the clutch 36 engaged. The transmission 4 is controlled by means of a transmission controller TC so that a transmission gear ratio (or a speed-change ratio or simply a transmission ratio) is controlled to a desired transmission ratio based on both the vehicle speed and the throttle opening. Actually, the desired transmission ratio is map-retrieved based on the vehicle speed and the throttle opening from a preprogrammed speed-change map showing how a desired transmission ratio varies relative to vehicle speed and throttle opening TH. For example, the desired transmission ratio is map-retrieved from the predetermined speed-change map on the basis of the current vehicle speed and throttle opening and thus selected from a 1st speed gear, a 2nd speed gear, a 3rd speed gear, and a 4th speed gear (overdrive). In the system of the embodiment, the transmission 4 is an automatic transmission. The transmission 4 has an engine-braking clutch, such that, with the engine-braking clutch engaged, a back driving force or a back driving torque (corresponding to a reaction force transmitted from the road surface to the drive wheels 5) can be transferred toward the torque composition mechanism. Returning to FIG. 1, an engine speed sensor 8 is installed on the engine 1 for detecting a rotational speed (engine speed $N_E$) of the output shaft of engine 1, whereas a motor/generator speed sensor 9 is attached to the motor/generator 2 for detecting a rotational speed (motor/generator speed $N_{M/G}$) of the output shaft of motor/generator 2. An inhibitor switch 10 outputs a range signal RS indicative of an operating range selected by a selector lever (not shown). A throttle opening sensor 11 is provided for detecting a throttle opening TH corresponding to an amount of depression of an accelerator pedal. Input information signals $N_E$, $N_{M/G}$, RS, and TH from these engine/vehicle sensors/switches 8, 9, 10, and 11 are supplied into the motor/generator controller 12 which controls both the motor/generator 2 and the direct-coupling clutch 36. By way of two-way communication or intercommunication between transmission controller TC and motor/generator controller 12, the motor/generator controller also receives a transmission signal TS as input information representative of a current transmission ratio of the transmission 4, and a state of engagement/disengagement of the engine-braking clutch incorporated in the transmission 4. The motor/generator controller 12 generally comprises a microcomputer 12e. The microcomputer 12e of motor/generator controller 12 includes an input interface circuitry 12a, a microprocessor or a central processing unit (CPU) or an arithmetic processing unit 12b, a memory storage device or memories (Operating-data memory (RAM), Fixed-value memory (ROM)) 12c, and an output interface circuitry 12d. The input interface circuitry 12a of motor/generator controller 12 receives input information from various engine/vehicle switches and sensors, namely the engine speed sensor signal $N_E$ from the engine speed sensor 8, the motor/generator speed sensor signal $N_{M/G}$ from the motor/generator speed sensor 9, the range signal RS from the inhibitor switch 10, the throttle opening indicative signal TH from the throttle opening sensor 11, and the transmission signal TS from the transmission controller TC. The arithmetic processing unit 12b becomes operative when an ignition key switch (not shown) is turned on, and thus there is electric power flow to the microcomputer 12e. As soon as the microcomputer becomes switched on, input informational data stored in the memories 12c are initialized. A motoring-duty-cycle control signal (or a driving-duty-cycle control signal) MS and a power-generation-duty-cycle control signal GS, which are supplied to the motor/generator 2, are reset to OFF states. During initializing, the clutch control signal CS input into the solenoid 36a of direct-coupling clutch 36 is reset to an OFF state. Thereafter, at least when the hybrid vehicle is started, the motor/generator 2 and the direct-coupling clutch 36 are controlled based on the engine speed data NE, the motor/generator speed data $N_{M/G}$, the range signal RS, the throttle opening TH, and the transmission signal TS. The system of the embodiment is designed to perform a so-called idle-stop mode in which the engine 1 is stopped during vehicle stand-still. On the other hand, the memory storage device 12c pre-stores a predetermined processing program needed for arithmetic processing executed within the arithmetic processing unit 12b. The memory storage device 12c memories various data needed for arithmetic operations performed within the arithmetic processing unit 12b. For the necessary arithmetic processing, within the motor-generator controller 12, the arithmetic processing unit 12b allows the access by the I/O interface of input informational data signals from the previously-noted engine/vehicle switches and sensors. For instance, as can be seen from the flow chart shown in FIGS. 11 or 13, the arithmetic processing unit 12b of motor/generator controller 12 is responsible for carrying the motor/generator torque control program stored in the memory storage device 12c. Computational results or arithmetic calculation results, that is, the driving-duty-cycle control signal MS, the power-generation-duty-cycle control signal GS, and the clutch control signal CS are relayed via the output interface circuitry 12d to output stages, namely motor/generator driving circuit 7 and electromagnetic solenoid 36a. In the system of the embodiment, the motor/generator 2 serves as a braking device by utilizing counter electro-motive force. Concretely, when the motor/generator 2 functions as a generator during braking-torque-increase control, a duty ratio of the duty cycle control signal DS supplied to the chopper 7a of motor/generator driving circuit 7 is set to a high duty cycle value to produce an increased counter electro-motive force, thus resulting in increased braking torque. In contrast to the above, when the motor/generator 2 functions as an electric motor during braking-torque-increase control, a duty ratio of the duty cycle control signal DS is set to a low duty cycle value to reduce a driving torque value, thus resulting in increased braking torque. On the other hand, when the motor/generator 2 functions as a generator during braking-torque-decrease control, a duty ratio of the duty cycle control signal DS is set to a low duty cycle value to reduce the counter electro-motive force produced, thus reducing braking torque. Conversely, when the motor/generator 2 functions as an electric motor during braking-torque-decrease control, a duty ratio of the duty cycle control signal DS is set to a high duty cycle value to increase driving torque, thus reducing braking torque.

Figure 3:
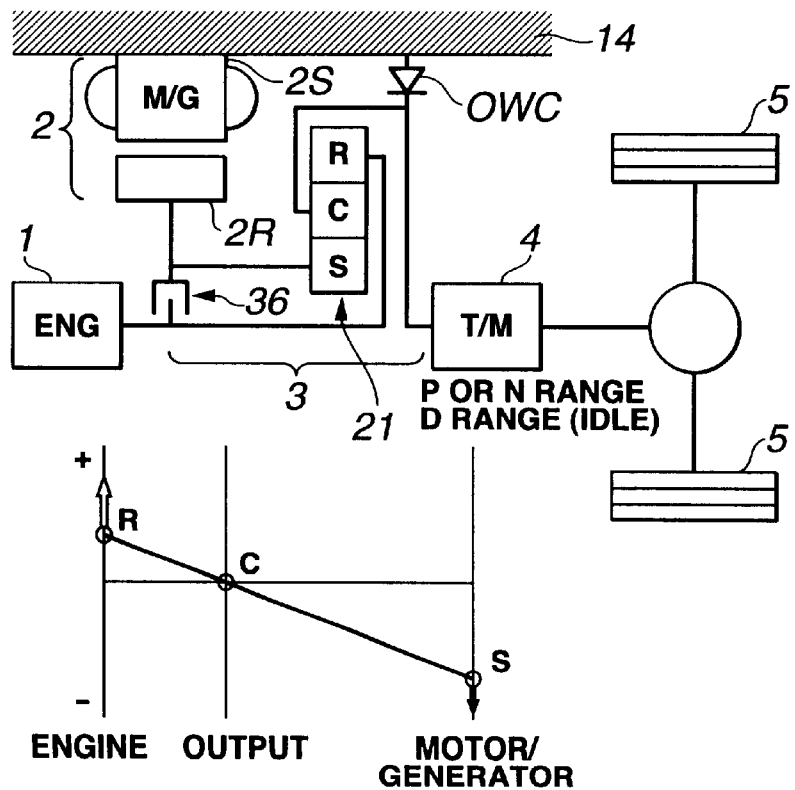
FIG. 3 shows a nomographic chart and a schematic diagram of the parallel hybrid system under a condition in which the engine is started up.
Figure 4A:
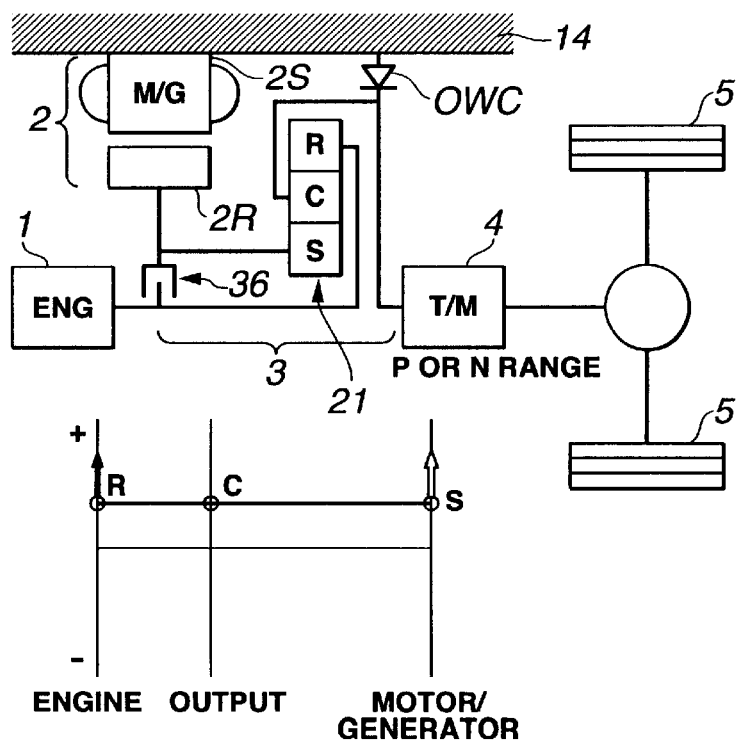
FIG. 4A shows a nomographic chart and a schematic diagram of the parallel hybrid system under a condition in which the motor/generator is driven in its normal-rotation direction by the engine to recharge the battery.
Figure 4B:
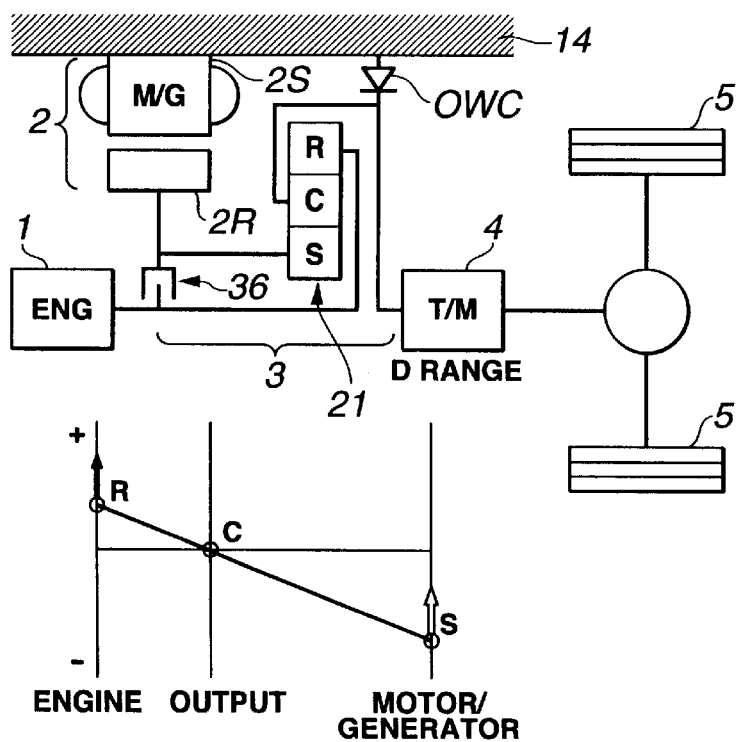
FIG. 4B shows a nomographic chart and a schematic diagram of the parallel hybrid system under a condition in which the motor/generator is driven in its reverse-rotation direction by the engine to recharge the battery.

Hereunder described in detail are various operating states of engine 1 and motor/generator 2, which are controlled by the motor/generator controller 12 and the engine controller EC, depending on a vehicle running state, a state of the storage battery device 6, such as a state of charge (or a charging rate) of the car battery, and engine/vehicle operating conditions. As discussed above, during the vehicle stand-still, the engine 1 is stopped according to the idle-stop mode. If the motor/generator 2 is rotated in the reverse-rotation direction at a predetermined rotational speed (that is, in such a manner as to produce a required motor/ generator torque as well as a required motor/generator speed) when the throttle opening TH exceeds a predetermined value "0" under a condition in which either one of various gear ranges such as a 1st gear range, a 2nd gear range, 3rd gear range, a D range (drive range), a P range (parking range), and a N range (neutral range) is selected by means of the selector lever, the engine 1 is rotated in the normal-rotation direction, since the one-way clutch OWC prevents the planet-pinion carrier C from rotating in its reverse-rotation direction (see the nomographic chart shown in FIG. 3). Under these conditions, the engine 1 starts to rotate by initiating the fuel-injection operation. At the same time when the engine is started, the oil pump is also driven. In particular in case that the P range or N range is selected, the input and output sides of transmission 4 are not connected to each other. In this case, in order to start the engine 1, the direct-coupling clutch 36 may be engaged to rotate the motor/generator 2 in the normal-rotation direction in the directly-coupled state between the engine 1 and the motor/ generator 2, and consequently to produce positive torque output needed to start the engine 1. If the vehicle remains stopped after the engine start-up by a foot brake, the storage battery device 6 such as the car battery is recharged, utilizing the torque output of the engine 1. In such a case, the motor/generator 2 is functioning as a generator that recharges the battery. At this time, if either the P range or N range is selected by the selector lever, as discussed above, the input and output sides of transmission 4 are not connected to each other. In such a case, as shown in FIG. 4A, the engine 1 is directly coupled with the motor/generator 2 via the direct-coupling clutch 36, and thus the positive torque output is produced by driving the motor/generator 2 in the normal-rotation direction by rotation of the engine output shaft (engine crankshaft) so as to generate electricity and to recharge the battery. On the other hand, when the running gear range such as the 1st gear range, 2nd gear range, 3rd gear range, or the D range is selected, the input and output sides of transmission 4 are connected to each other. In such a case, as shown in FIG. 4B, the positive torque output is produced by driving the motor/generator 2 in the reverse-rotation direction by rotation of the engine output shaft (engine crankshaft) so as to generate electricity and to recharge the battery, while the reverse-rotation of the pinion carrier C is prevented by the one-way clutch OWC.

Figure 5:
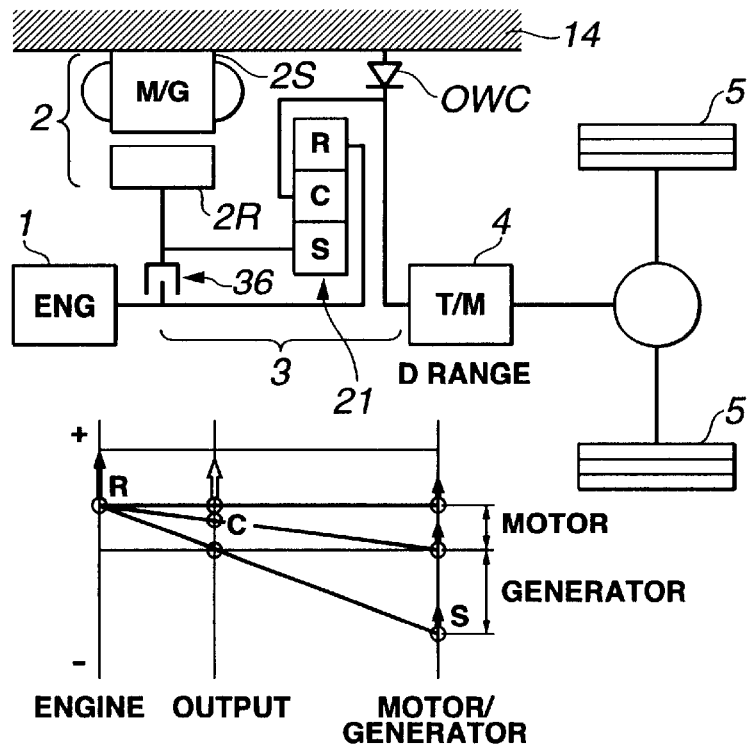
FIG. 5 shows a nomographic chart and a schematic diagram of the parallel hybrid system during an accelerating condition of the vehicle.
Figure 7:
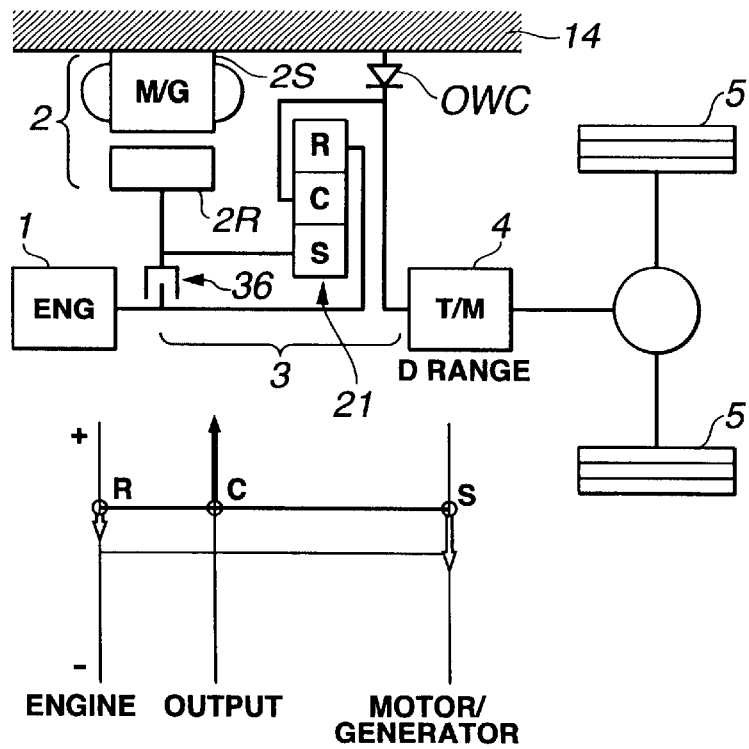
FIG. 7 shows a nomographic chart and a schematic diagram of the parallel hybrid system under a condition in which the motor/generator is employed to regenerate electricity which is stored in the battery.
Figure 6A:
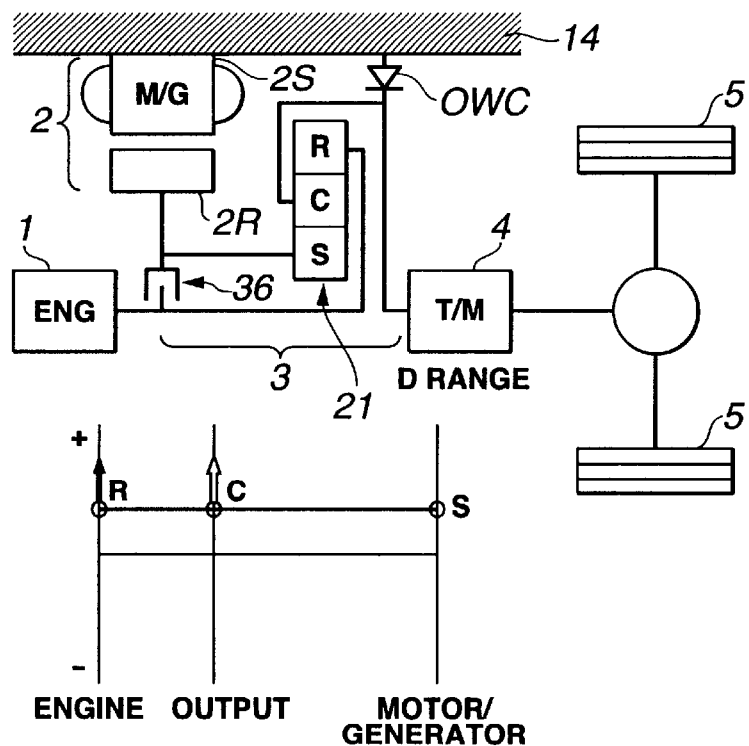
FIG. 6A shows a nomographic chart and a schematic diagram of the parallel hybrid system under a condition in which the vehicle is propelled by only the engine.
Figure 6B:
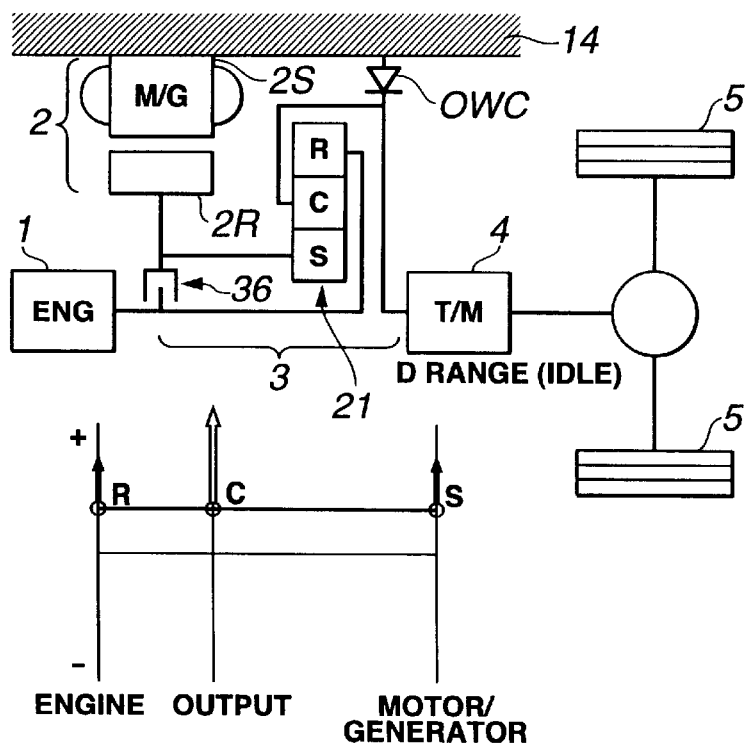
FIG. 6B shows a nomographic chart and a schematic diagram of the parallel hybrid system under a condition in which the vehicle is propelled by the engine assisted by the motor/generator.

On the other hand, when the running gear range such as the D range is selected and additionally the accelerator pedal is depressed, as shown in FIG. 5, the positive torque output is produced in such a manner as to change from the reverse-rotation state of motor/generator 2 to the normal-rotation state while keeping the engine speed NE at a desired engine speed NEP in the disengaged state of the direct-coupling clutch 36. The positive torque is applied to the pinion carrier C, and thus the vehicle is started and gradually accelerated. The previously-noted desired engine speed $N_{EP}$ can be retrieved from a predetermined characteristic map or a predetermined look-up table showing how a desired engine speed $N_{EP}$ varies relative to a throttle opening TH. For example, the predetermined $N_{EP}$ versus TH characteristic map is preprogrammed such that the desired engine speed $N_{EP}$ increases with an increase in the throttle opening TH. When the motor/generator 2 is still rotating in the reverse-rotation direction during the initial stages of the vehicle starting period or accelerating period by virtue of the positive torque output, the motor/generator 2 functions as a generator. Conversely, when the rotational state of motor/ generator 2 has been switched from the reverse-rotation state to the normal-rotation state, the motor/generator 2 functions as an electric motor. After this, the motor/generator speed gradually increases and reaches the engine speed which is kept at the desired engine speed $N_{EP}$. As soon as the motor/generator speed reaches a value substantially corresponding to the engine speed NE (the desired engine speed NEP), the direct-coupling clutch 36 is engaged and thus the vehicle is run in the directly-coupled state between the engine 1 and the motor/generator 2. For example, it is undesirable to use the motor/generator 2 as an electric motor under a particular condition, such as during high-speed running, when the accelerator pedal is greatly depressed, when the reduction ratio of the transmission 4 is high, or in case of a less charging rate of the storage battery device 6. In this case, as shown in FIG. 6A, the motor/generator 2 runs or rotates free and does not deliver power (torque) to the transmission, and thus the vehicle is propelled by virtue of torque output generated by only the engine 1. Conversely, under the other conditions, such as during low-speed running, when the accelerator pedal is slightly depressed (during part-load operation), when the reduction ratio of the transmission 4 is low, or in case of a high charging rate of the storage battery device 6, it is preferable to use the motor/generator 2 as an electric motor (or a propulsion motor). In this case, as shown in FIG. 6B, the motor/ generator 2 is driven in the normal-rotation direction to produce a positive torque output by means of the motor/ generator 2. As a result, the vehicle is propelled by the engine 1 assisted by the motor/generator 2. In contrast to the vehicle accelerating state, when the vehicle is decelerated, a better engine-braking response is required. During the vehicle deceleration, as shown in FIG. 7, the motor/ generator 2 is used as a generator while keeping the direct-coupling clutch 36 in the engaged state, so as to produce a negative torque output against the back driving torque (reaction force transmitted from the road surface to the drive wheels), and consequently to ensure an engine-braking effect and an enhanced braking force, in place of or in addition to the engine-braking effect of the engine 1 itself.

Figure 8A:
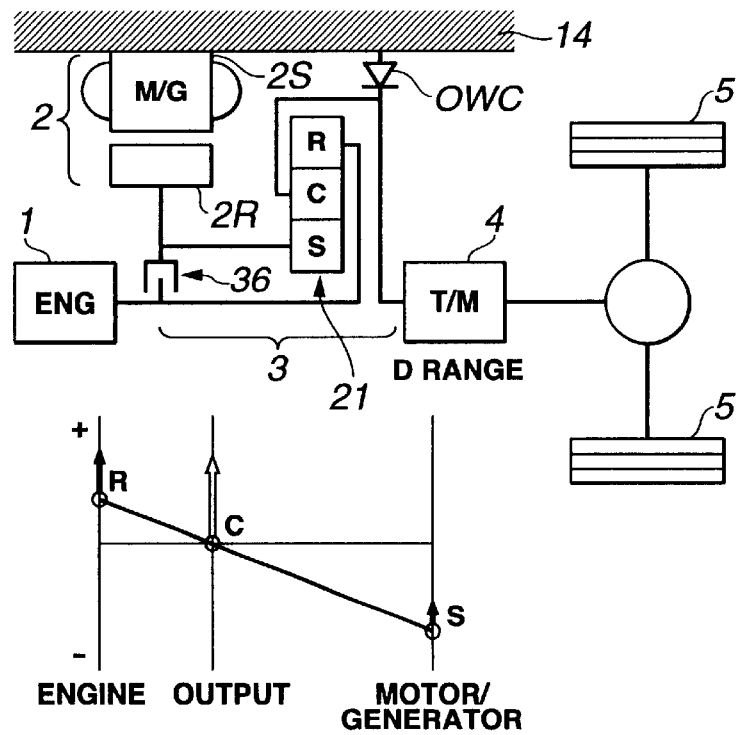
FIG. 8A shows a nomographic chart and a schematic diagram of the parallel hybrid system during a creep-running mode by way of the combined driving torque of the engine and motor/generator.
Figure 8B:
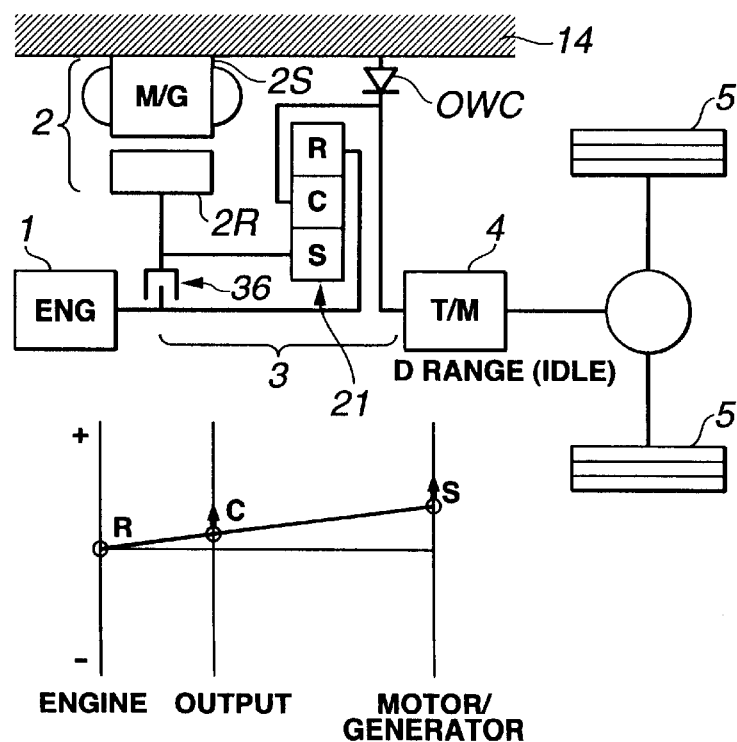
FIG. 8B shows a nomographic chart and a schematic diagram of the parallel hybrid system during a creep-running mode by way of the torque output generated by the motor/generator.

In addition to the above, in the system of the embodiment sets a creep-running mode at each of the running ranges such as the 1 range, 2 range, 3 range, or D range. For example, just after the engine is started, as shown in FIG. 8A, a positive torque output is produced by means of the motor/ generator 2, while producing a positive torque output by means of the engine 1 running at an idle rpm, and thus the vehicle creeps by way of a combined driving torque of the positive torque outputs produced from the motor/generator 2 and engine 1. On the other hand, when the engine 1 is not yet started, as shown in FIG. 8B, the positive torque output is produced by rotating the motor/generator 2 in the normal-rotation direction with the result that the vehicle can creep.

Figure 9A:
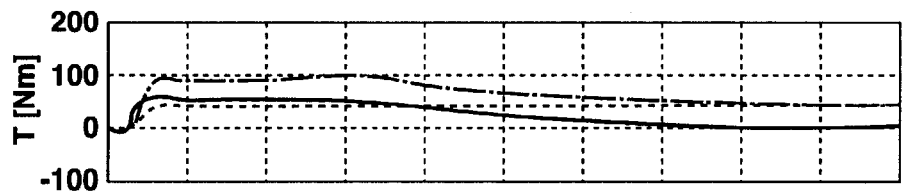
FIGS. 9A–9F are timing charts illustrating the operating conditions of the engine and motor/generator when the parallel hybrid vehicle is started and then accelerated.
Figure 9B:
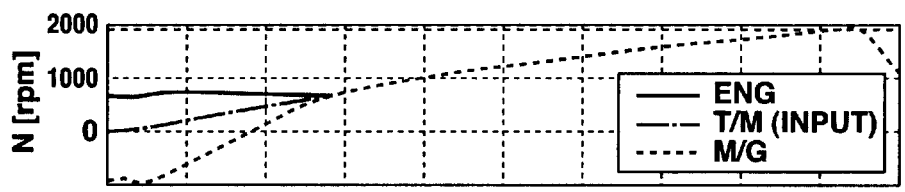
Figure 9C:
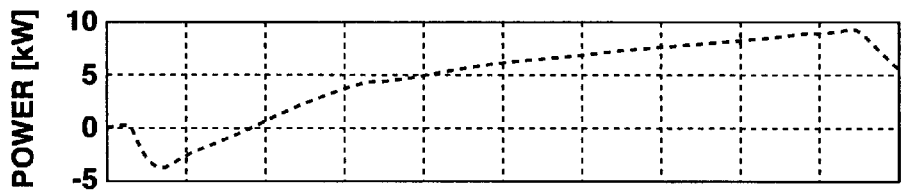
Figure 9D:
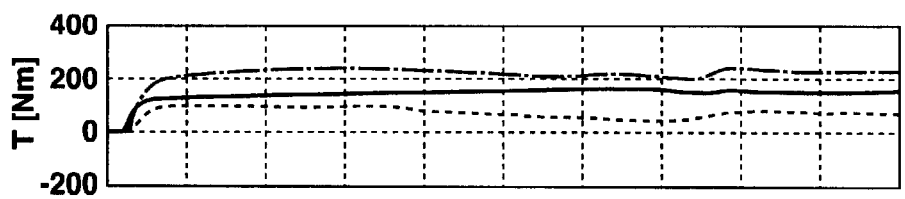
Figure 9E:
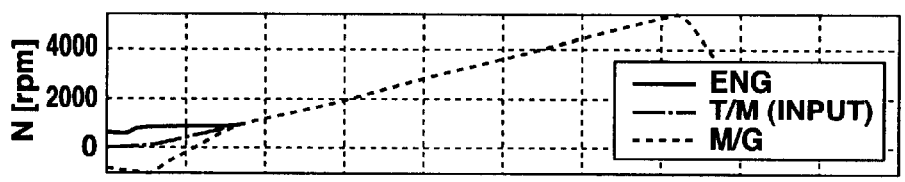
Figure 9F:
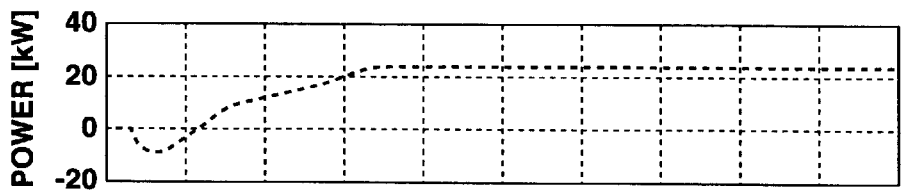
Figure 10:
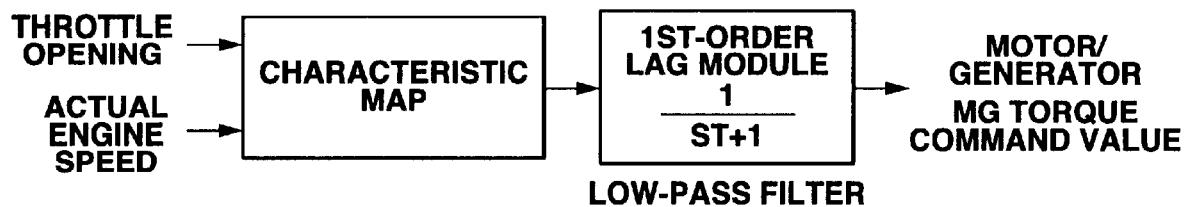
FIG. 10 is a schematic block diagram showing motor/generator control performed by the electronic motor/generator controller incorporated in the parallel hybrid system of the hybrid vehicle of the invention.
Figure 11:
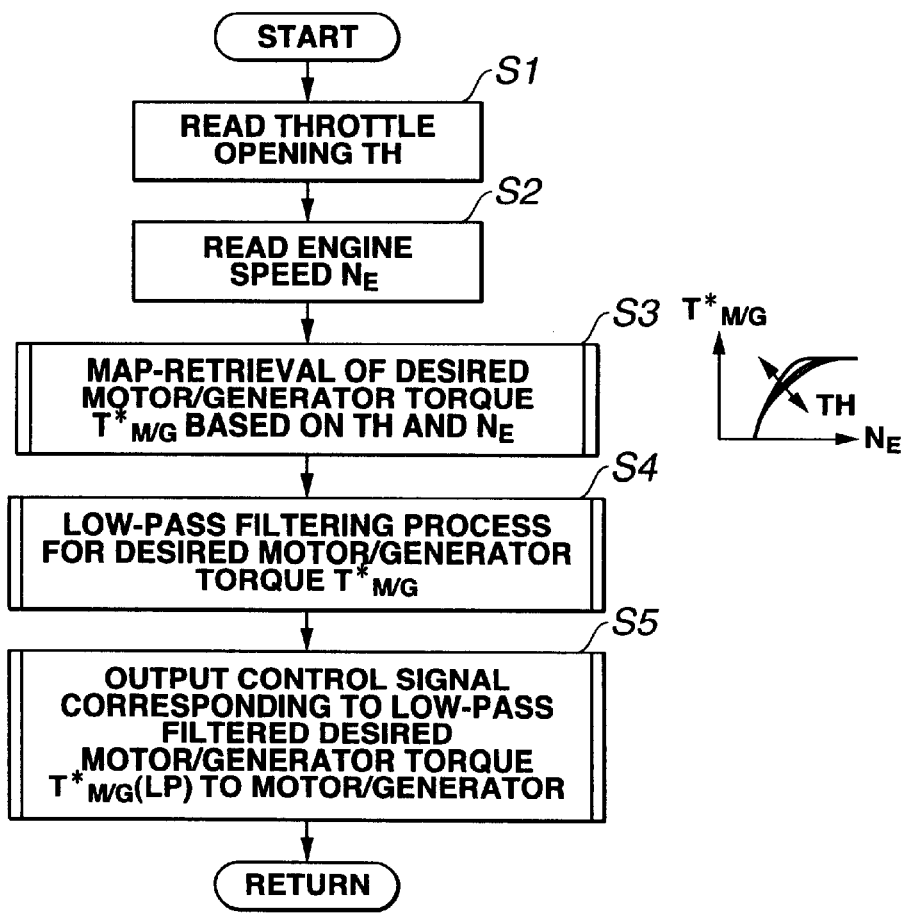
FIG. 11 is a flow chart illustrating one arithmetic processing performed within the controller shown in FIG. 10.

FIGS. 9A–9C show the timing charts obtained during vehicle starting period under part-throttle conditions with the accelerator pedal slightly depressed. Under these conditions, it is unnecessary to rapidly remarkably accelerate the vehicle speed by driving the motor/generator 2 at high speeds. Thus, with the direct-coupling clutch 36 disengaged, from just after the engine start-up, the driving state of motor/generator 2 is gradually moderately transferred from the reverse-rotation state to the normal-rotation state, to produce the desired positive torque output. Thereafter, as soon as the motor/generator speed reaches a value substantially corresponding to the engine speed, and thus the direct-coupling clutch becomes engaged to directly couple the engine 1 with the motor/generator 2, the engine torque generated by the engine 1 is further reduced, such that the vehicle can be propelled and accelerated by almost all the torque output generated by only the motor/generator 2. In contrast to the above, FIGS. 9D–9F show the timing charts obtained during vehicle starting period under full-throttle conditions with the accelerator pedal fully depressed. Under these conditions, high-speed rotation of the motor/generator 2 means a reduction in motor torque output of the motor/generator 2. The reduced motor torque output of motor/generator 2 rotating at high speeds is insufficient to rapidly accelerate the vehicle. For the reasons set forth above, when the quick vehicle acceleration is required just after the engine start-up, the driving state of motor/generator 2 is quickly transferred from the reverse-rotation state to the normal-rotation state, so as to advance a timing direct-coupling the engine 1 with the motor/generator 2 via the clutch 36. After the direct-coupling operation between the engine 1 and motor/generator 2 is completed, the engine torque output is smoothly increased. Thus, during the quick vehicle acceleration, the vehicle is propelled by both the torque output produced from engine 1 and the torque output produced from motor/generator 2, and as a result the vehicle speed can reach a high vehicle speed. In FIGS. 9A and 9D, a characteristic curve denoted by T [unit: Nm] and indicated by the solid line illustrates variations in the engine torque generated by engine 1, a characteristic curve denoted by T [unit: Nm] and indicated by the one-dotted line illustrates variations in the combined torque input into the transmission input shaft, and a characteristic curve denoted by T [unit: Nm] and indicated by the broken line illustrates variations in the torque output generated by motor/generator 2. In FIGS. 9B and 9E, a characteristic curve denoted by N [unit: rpm] and indicated by the solid line illustrates variations in the engine speed NE of engine 1, a characteristic curve denoted by N [unit: rpm] and indicated by the one-dotted line illustrates variations in the rotational speed of the transmission input shaft, and a characteristic curve denoted by N [unit: rpm] and indicated by the broken line illustrates variations in the motor/generator speed $N_{M/G}$ of motor/generator 2. In FIGS. 9C and 9F, a characteristic curve denoted by "Power" [unit: kW] and indicated by the broken line illustrates variations in electric power of motor/generator 2. In FIGS. 9C and 9F, the positive electric power above the zero power line (0 kW) means electric power consumed by motor/generator 2, while the negative electric power below the zero power line means electric power generated by motor/generator 2. The motor/generator torque/speed control shown in FIGS. 9A–9F must be performed, taking into account a degree of vehicle acceleration mainly required by the driver. In order to timely accurately reflect the driver's wishes, the system of the embodiment uses the throttle opening TH selected by the driver as well as the actual engine speed $N_E$ sensed by engine speed sensor 8, as parameters. Actually, a desired motor/generator torque is computed or arithmetically calculated on the basis of the throttle opening TH and engine speed $N_E$. To achieve the desired motor/generator torque, the rotating state (or the driving state) and the torque output of motor/generator 2 are controlled by means of the motor/generator controller 12. For example, the motor/generator controller 12 performs motor/generator control as shown in FIG. 10. As can be seen from the block diagram of FIG. 10, a desired motor/generator torque is arithmetically calculated or retrieved based on both the actual engine speed $N_E$ and the throttle opening TH from a preprogrammed characteristic map showing how the desired motor/generator torque varies relative to both engine speed $N_E$ and throttle opening TH. A signal indicative of the desired motor/generator torque $T^*_{M/G}$ map-retrieved is input into a response-characteristic compensation section of the motor/generator controller, such as a first-order low-pass filter (serving as a first-order lag module) that transmits or passes signals at a requency below a given cutoff frequency and attenuates ignals with a frequency above the given cutoff frequency. The response-characteristic compensation section (e.g., the low-pass filter) functions to attenuate high-input-frequency components and to pass low-input frequency components. In other words, the response-characteristic compensation section functions to produce a low gain at high-input-frequency components and to produce a high gain at low-input-frequency components. In the shown embodiment, the low-pass filter is used as the response-characteristic compensation section. In lieu thereof, a phase-lag compensating network such as an integrator often called "integral network" (also known as lagging network or lag network) may be used as the response-characteristic compensation section. The integrator can provide substantially the same effect of the low-pass filter. The signal passing the response-characteristic compensation section, that is, the low-pass filtered signal value $T^*_{M/G}(LP)$ is used as a final desired motor/generator torque command value. Hereinbelow described in detail in reference to the flow chart of FIG. 11 is one example of arithmetic processing required to output the previously-discussed desired motor/generator torque command value. The arithmetic processing shown in FIG. 11 is executed as time-triggered interrupt routines to be triggered every predetermined intervals ΔT within the arithmetic processing unit 12b of motor/generator controller 12.

At step S1, the throttle opening TH sensed by throttle opening sensor 11. At step S2, the engine speed $N_E$ sensed by the engine speed sensor 8 is read. At step S3, the desired motor/generator torque $T^*_{M/G}$ is map-retrieved based on both the throttle opening TH read through step S1 and the engine speed $N_E$ read through step S2, from the predetermined characteristic map (which will be fully described later) shown in FIG. 12. At step S4, a low-pass filtering process (exactly, a first-order low-pass filtering process) is made to a signal indicative of the desired motor/generator torque $T^*_{M/G}$ map-retrieved. In the low-pass filtering process of step S4, the processor of motor/generator controller 12 pre-stores a predetermined frequency characteristic according to which the low-pass filter passes signals at a frequency below a given cutoff frequency which is set to be lower than a power-train torsional-vibration frequency being obtainable for example when the gear range of transmission 4 is kept in the 1st gear range. That is, the low-pass filter passes only the signals contained within a frequency band lower than the power-train torsional-vibration frequency. By way of the low-pass filtering process, even when the input signal indicative of the desired motor/generator torque $T^*_{M/G}$ contains powertrain vibration frequency components, all other signals above the given cutoff frequency (that is, the powertrain vibration frequency) can be effectively attenuated. Thereafter, at step S5, a control signal corresponding to the low-pass filtered desired motor/generator torque value $T^*_{M/G}(LP)$ is generated. In this manner, a series of arithmetic operations needed to output the desired motor/generator torque command value $(T^*_{M/G}(LP))$ are terminated, and then the routine returns to the main program.

Figure 12:
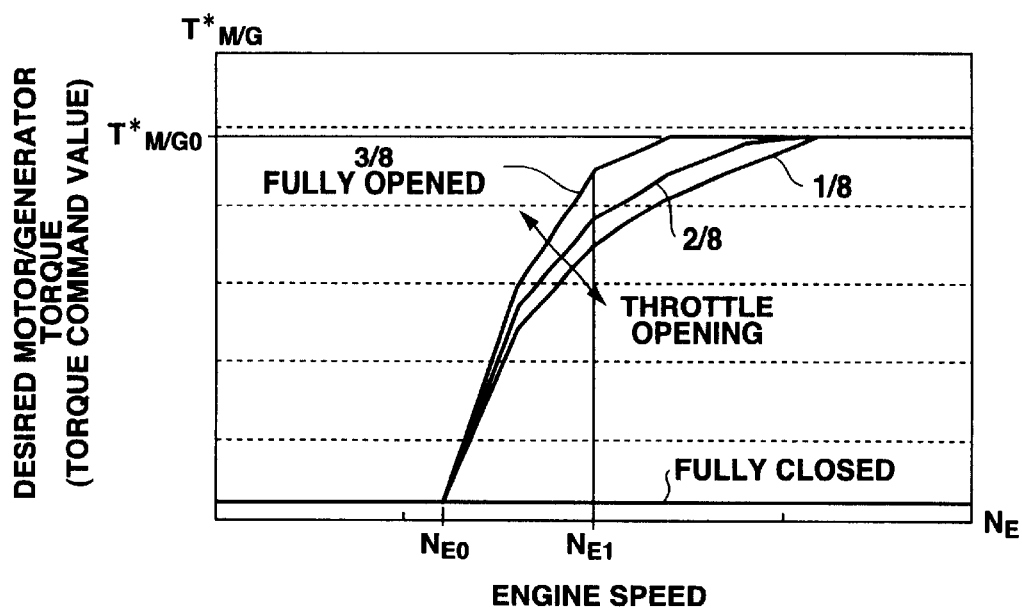
FIG. 12 is a preprogrammed two-dimensional characteristic map showing the relationship among engine spee $N_E$, a throttle opening TH, and a desired motor/generator torque $T^*_{M/G}$, and used in the arithmetic ocessing of FIG. 11.

Referring to FIG. 12, there is shown the predetermined $N_E$ versus $T^*_{M/G}$ characteristic map used at step S3 for each of throttle openings, such as % (fully-closed), ⅛ throttle, ⅜ throttle, and ⅜ throttle (full-throttle). As can be seen from FIG. 12, the predetermined characteristic map is preprogrammed as a two-dimensional map according to which the desired motor/generator torque $T^*_{M/G}$ is computed or retrieved on the basis of the engine speed $N_E$, using the throttle opening TH as a parameter. As can be appreciated from the map of FIG. 12, the desired motor/generator torque $T^*_{M/G}$ is set to zero in a first specified speed range below a first predetermined engine speed NE0 which is set at a value substantially corresponding to an idle speed of the engine 1. This is because the engine torque output tends to unstably fluctuate in the first specified speed range below an idling speed, and thus there is a risk of stalling the engine 1, due to unfavorable setting of the desired motor/generator torque $T^*_{M/G}$ to a value above zero in the first specified speed range ($N_E \leq N_{E0}$). Additionally, if the motor/generator speed $N_{M/G}$ reaches a value substantially corresponding to the engine speed $N_E$ in the first specified speed range lower than the idling speed, there is a possibility that the engine 1 is directly coupled with the motor/generator 2 in the first specified speed range lower than the idling speed. Suppose the positive torque output produced from motor/generator 2 becomes zero with the engine directly coupled with the motor/generator 2 in the first specified speed range. In this case, the vehicle must be accelerated by means of the engine 1 running at speeds lower than the idling speed. there is an increased tendency for the engine to stall, thus causing unstable vehicle behavior and lowering vehicle driveability. To avoid this, the desired motor/generator torque $T^*_{M/G}$ is set to zero in the previously-noted first specified speed range ($N_E \leq N_{E0}$) below the first predetermined engine speed $N_{E0}$. By virtue of the favorable setting of the desired motor/generator torque $T^*_{M/G}$ to zero in the first specified speed range ($N_E \leq N_{E0}$), the engine speed can be smoothly rapidly risen up to the desired engine speed.

In a second specified speed range ($N_{E0} < N_E < N_{E1}$) greater than the first predetermined engine speed $N_{E0}$ and less than a second predetermined engine speed $N_{E1}$, the desired motor/generator torque $T^*_{M/G}$ is set or preprogrammed to gradually increase with an increase in the engine speed $N_E$. Therefore, according to the $N_E$ versus $T^*_{M/G}$ characteristic in the second specified speed range ($N_{E0} < N_E < N_{E1}$), it is possible to start and accelerate the vehicle with the aid of the torque output produced from motor/generator 2 without excessively increasing the engine speed. Actually, in the system of the shown embodiment, the desired motor/generator torque $T^*_{M/G}$ is set to become less than the engine torque output produced from engine 1, for the reason set out below. As discussed above, the parallel hybrid system of the embodiment employs the torque composition mechanism with the planetary gear system 21. Planetary gear system 21 itself has the torque-multiplication function based on the gear ratio of sun gear to ring gear. That is, the torque output produced from motor/generator 2 can be multiplied owing to the gear ratio of sun gear to ring gear. Thus, it is possible to satisfactorily start or propel the vehicle by way of a comparatively small motor/generator torque produced by motor/generator 2. In addition to the previously-discussed relationship between engine speed $N_E$ and desired motor/generator torque $T^*_{M/G}$, the desired motor/generator torque $T^*_{M/G}$ also increases with an increase in the throttle opening TH. In case of the same engine speed $N_E$ (or the same engine torque output), the greater the throttle opening TH, the greater the desired motor/generator torque $T^*_{M/G}$. Therefore, the rotational state of motor/generator 2 which is rotating in the reverse-rotation direction just after engine start-up, can be quickly changed to the normal-rotation state. As can be seen from FIGS. 9C and 9F, during initial stages of the starting period, the motor/generator functions as a generator for a brief moment. Thereafter, the motor/generator 2 begins to function as an electric motor. With the motor/generator 2 functioning as a motor, the torque output produced from motor/generator 2 tends to become smaller with a rise in the motor/generator speed. For this reason, actually, in the second specified speed range ($N_{E0} < N_E < N_{E1}$), it is not easy to achieve the desired motor/generator torque $T^*_{M/G}$. On the other hand, the motor/generator speed $N_{M/G}$ rapidly reaches a value substantially corresponding to the engine speed $N_E$ during the starting period of the vehicle, and thus the engine 1 can be directly coupled with the motor/generator 2 via the direct-coupling clutch 36 in a comparatively early stage of the starting period. After the direct-coupling, driving torque needed for vehicle acceleration can be supplied by the torque output produced from the engine rather than the torque output produced from the motor/generator. This prevents the motor/generator 2 from producing an undesirably high motor/generator torque during the vehicle starting period. As discussed above, the greater the throttle opening TH, the greater the desired motor/generator torque $T^*_{M/G}$. In other words, the smaller the throttle opening TH, the smaller the desired motor/generator torque $T^*_{M/G}$. With the throttle opening kept at a small opening and with the desired motor/generator torque set at a small torque value, the rotational state of motor/generator 2 which is rotating in the reverse-rotation direction just after engine start-up, cannot be quickly changed to the normal-rotation state. In such a case, the motor/generator speed $N_{M/G}$ does not easily reach the engine speed $N_E$, and thus the engine 1 is very late in directly coupling with the motor/generator 2. This means that the vehicle can be propelled or accelerated moderately by way of almost all the torque output produced from only the motor/generator 2 (in actual by a combined torque of the torque output produced from motor/generator 2 and the torque output produced from engine 1 running at an idle rpm), for example, when the vehicle is moderately started and accelerated with a relatively low acceleration (with a small throttle opening TH).

In a third specified speed range ($N_{E1} \leq N_E \leq N_{E2}$) greater than or equal to the second predetermined engine speed $N_{E1}$ and less than or equal to a third predetermined engine speed $N_{E2}$, the desired motor/generator torque $T^*_{M/G}$ is set to be identical to the output torque produced from the engine 1. The third predetermined engine speed $N_{E2}$ is not fixed to a constant value, but varied smaller with an increase in the throttle opening TH. Depending on the settings of the desired motor/generator torque $T^*_{M/G}$ and engine torque in the third specified speed range ($N_{E1} \leq N_E \leq N_{E2}$), the motor/generator speed $N_{M/G}$ is also set to be identical to a value substantially corresponding to the engine speed $N_E$. In a fourth specified speed range ($N_{E2} < N_E$) greater than the third predetermined engine speed $N_{E2}$, the desired motor/generator torque $T^*_{M/G}$ is set to a torque value substantially corresponding to the output torque produced from the engine 1 within a torque zone ranging from the engine output torque value to a predetermined upper torque limit $T^*_{M/G0}$. That is to say, if the desired motor/generator torque $T^*_{M/G}$ is reached at a timing when the engine speed $N_E$ has exceeded the second predetermined engine speed $N_{E1}$, at this time there is an increased tendency for the motor/generator speed $N_{M/G}$ to reach a speed value substantially corresponding to the engine speed $N_E$. Under these conditions, when the engine 1 is directly coupled with the motor/generator 2 by way of engagement of the direct-coupling clutch 36, there is no necessity for torque matching between engine 1 and motor/generator 2. Thus, it is possible to accelerate the vehicle with a better favorable acceleration feeling by means of only the engine 1, while gradually reducing the torque output produced from the motor/generator 2. As can be appreciated from the characteristic polygonal line shown in FIG. 12, a rate of change (a gradient of torque-increase) in desired motor/generator torque $T^*_{M/G}$ with respect to a change in engine speed $N_E$, corresponds to a gain of desired motor/generator torque $T^*_{M/G}$. In the embodiment, as can be seen from FIG. 12, the $N_E$ versus $T^*_{M/G}$ characteristic is formed as a polygonal line whose gradient (corresponding to the gain) gradually decreases through several stages with an increase in engine speed $N_E$. For the reason set out above, it is undesirable to directly couple the engine 1 with the motor/generator 2 in the first specified speed range ($N_E \leq N_{E0}$) below the first predetermined engine speed $N_{E0}$ set at a speed value substantially corresponding to an idling speed. The system of the embodiment avoids positive motor/generator torque from being produced from the motor/generator 2 in the first specified speed range ($N_E \leq N_{E0}$). In the second specified speed range ($N_{E0} < N_E < N_{E1}$), the rate of change in desired motor/generator torque $T^*_{M/G}$ with respect to engine speed $N_E$, is high in order to produce a relatively high positive motor/generator torque from motor/generator 2, and consequently to smoothly accelerate the vehicle and to smoothly shift the rotational state of motor/generator 2 to the normal-rotational direction. Thereafter, in a state in which the engine speed $N_E$ reaches a value slightly higher than the second predetermined engine speed $N_{E1}$, the torque output produced from motor/generator 2 reaches a torque value substantially corresponding to the engine torque output produced from engine 1. At the same time, the motor/generator speed $N_{M/G}$ reaches a speed value substantially corresponding to the engine speed $N_E$. Under these conditions, the vehicle can be propelled by way of the combined torque by directly coupling the engine 1 with the motor/generator 2 via the clutch 36. The previously-discussed proper setting of the predetermined $N_E$ versus $T^*_{M/G}$ map shown in FIG. 12 (that is, the proper setting of the gain which is variable depending upon both engine speed $N_E$ and throttle opening TH), produces satisfactory effects as can be appreciated from comparison of the timing charts shown in FIGS. 9A–9C and the timing charts shown in FIGS. 9D–9F. Additionally, from a timing before the vehicle is started and accelerated, that is, from a timing before powertrain torsional vibrations occur, according to the control system of the embodiment, the desired motor/generator torque $T^*_{M/G}$ can be set or determined based on both engine speed $N_E$ and throttle opening TH by way of feedforward processing in which an anticipating correction signal is applied before process output is affected. Thus, the control system is not easily affected by the powertrain vibrations, thus reducing undesirable oscillations in the torque output $T_{M/G}$ produced from motor/generator 2 and the motor/generator speed $N_{M/G}$. This ensures stable vehicle acceleration.

Assuming that the desired motor/generator torque $T^*_{M/G}$ is determined based on the engine speed $N_E$ when the engine speed $N_E$ reflects undesirable powertrain torsional vibrations, there is a possibility that the desired motor/generator torque $T^*_{M/G}$ oscillates. For this reason, in the system of the embodiment, as previously described, the desired motor/generator torque $T^*_{M/G}$, which is map-retrieved from the predetermined characteristic map shown in FIG. 12, is filtered by means of the first-order low-pass filter having the predetermined frequency characteristic according to which the low-pass filter passes signals at a frequency below a given cutoff frequency which is set to be lower than a power-train torsional-vibration frequency being obtainable for example when the gear range of transmission 4 is kept in the 1st gear range. The low-pass filtered signal value output from the low-pass filter is used as the desired motor/generator torque command value to be output to motor/generator 2. This suppresses undesirable oscillations in the torque output produced from motor/generator 2 and the motor/generator speed, thereby enabling more stable vehicle acceleration during the starting period. Furthermore, the system time lag created by the low-pass filter acts to effectively suppress a rapid change in desired motor/generator torque $T^*_{M/G}$, arising from a rapid change in throttle opening TH, and also to suppress undesirable oscillations in the motor/generator speed and motor/generator torque. As a result, the powertrain torsional vibrations can be more effectively suppressed. This ensures down-sizing and lightening of the motor/generator 2 and also realizes reduced battery capacity of the storage battery device 6, thus ensuring reduced system production costs and small-sizing of the parallel hybrid system.

Figure 13:
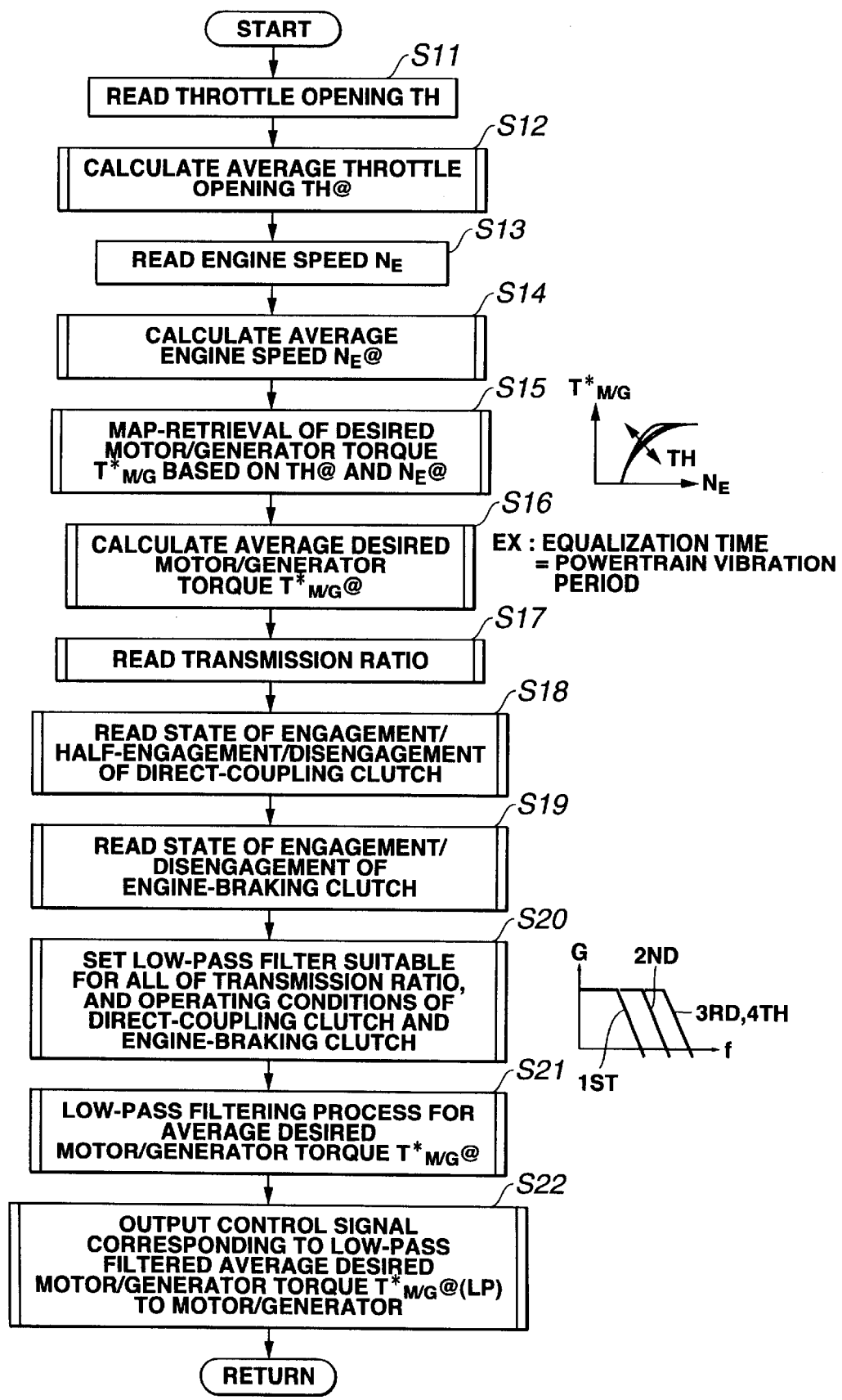
FIG. 13 is a flow chart illustrating a modified arithmetic processing performed within the controller of the parallel hybrid system.

Referring now to FIGS. 13, and 14A–14C, there is shown the modified arithmetic processing required to generate the low-pass filtered average desired motor/generator torque command value. The modified arithmetic processing shown in FIG. 13 is executed as time-triggered interrupt routines to be triggered every predetermined sampling time intervals $\Delta T$ within the arithmetic processing unit 12b of motor/generator controller 12.

At step S11, the throttle opening TH sensed by the throttle opening sensor 11 is read. At step S12, an average throttle opening TH@ is arithmetically calculated as a time mean of the throttle openings TH read every predetermined sampling time intervals $\Delta T$ and stored in predetermined memory addresses of the memory storage device 12c. In calculating the average throttle opening TH@, a predetermined low-pass filtering process having a specified system time-lag effect may be used. Alternatively, in a conventional manner, the time mean of the throttle openings TH may be arithmetically calculated as an arithmetic mean $(TH_{(1)} + TH_{(2)} + \ldots + TH_{(n-1)} + TH_{(n)})/n$ of a plurality of throttle opening data $(TH_{(1)}, TH_{(2)}, \ldots TH_{(n-1)}, TH_{(n)})$ stored in the memory storage device 12c. Thereafter, at step S13, the engine speed $N_E$ sensed by the engine speed sensor 8 is read. At step S14, an average engine speed NE@ is arithmetically calculated as a time mean of the engine speeds $N_E$ read every predetermined sampling time intervals $\Delta T$ and stored in predetermined memory addresses of the memory storage device 12c. In calculating the average engine speed $N_E$@, a predetermined low-pass filtering process having a specified system time-lag effect may be used. Alternatively, in a conventional manner, the time mean of the engine speeds $N_E$ may be arithmetically calculated as an arithmetic mean $(N_{E(1)} + N_{E(2)} + \ldots + N_{E(n-1)} + N_{E(n)})/n$ of a plurality of engine speed data $(N_{E(1)}, N_{E(2)}, \ldots, N_{E(n-1)}, N_{E(n)})$ stored in the memory storage device 12c. At step S15, the desired motor/generator torque $T^*_{M/G}$ is computed or map-retrieved based on both the average throttle opening TH@ and average engine speed NE@ from the same $N_E$ versus $T^*_{M/G}$ characteristic map shown in FIG. 12 as used in the arithmetic processing shown in FIG. 11. After this, at step S16, an average desired motor/generator torque $T^*_{M/G}$@ is arithmetically calculated as a time mean of the desired motor/generator torque data $T^*_{M/G}$ map-retrieved every predetermined sampling time intervals $\Delta T$ and stored in predetermined memory addresses of the memory storage device 12c. At step S17, by way of intercommunication between transmission controller TC and motor/generator controller 12, a current transmission ratio of the transmission 4 is read. At step S18, a state of engagement/half-engagement/disengagement of the direct-coupling clutch 36 is read, that is, a check is made to determine whether the direct-coupling clutch 36 is conditioned in a fully-engaged state (simply, in an engaged state) or a fully-disengaged state (simply, in a disengaged state) or a half-engaged state. In the shown embodiment, the direct-coupling clutch 36 is able to operate at either of the three different operating modes, namely the fully-engaged state, half-engaged state, and the fully-disengaged state. Alternatively, the direct-coupling clutch that is able to operate at either of the fully-engaged state and the fully-disengaged state may be used. For more accurate control, it is more preferable to use the direct-coupling clutch that is able to operate at either of three different operating modes, that is, fully-engaged, half-engaged, and fully-disengaged states. At step S19, a state of engagement/disengagement of the engine-braking clutch of transmission 4 is read, that is, a check is made to determine whether the engine-braking clutch of transmission 4 is conditioned in a fully-engaged state (simply, in an engaged state) or a fully-disengaged state (simply, in a disengaged state). Thereafter, at step S20, a low-pass filter (a frequency characteristic) is properly selected from a plurality of predetermined low-pass filters (pre-stored frequency characteristics) which are preprogrammed to be suitable for various factors, namely the latest up-to-date transmission ratio data obtained through step S17, input informational data indicative of engagement/half-engagement/disengagement of direct-coupling clutch 36 obtained through step S18, and input informational data indicative of engagement/disengagement of engine-braking clutch obtained through step S19. After this, at step S21, the low-pass filtering process, selected or determined through step S20, is made to the average desired motor/generator torque $T^*_{M/G}@$ computed through step S16, so as to produce a low-pass filtered average desired motor/generator torque $T^*_{M/G}@$ (LP). Finally, at step S22, a control signal (a final command) corresponding to the low-pass filtered average desired motor/generator torque $T^*_{M/G}@$ (LP) is generated. In this manner, a series of arithmetic operations needed to output the desired motor/generator torque command value ($T^*_{M/G}@$ (LP)) are terminated, and then the routine returns to the main program.

Figure 14A:
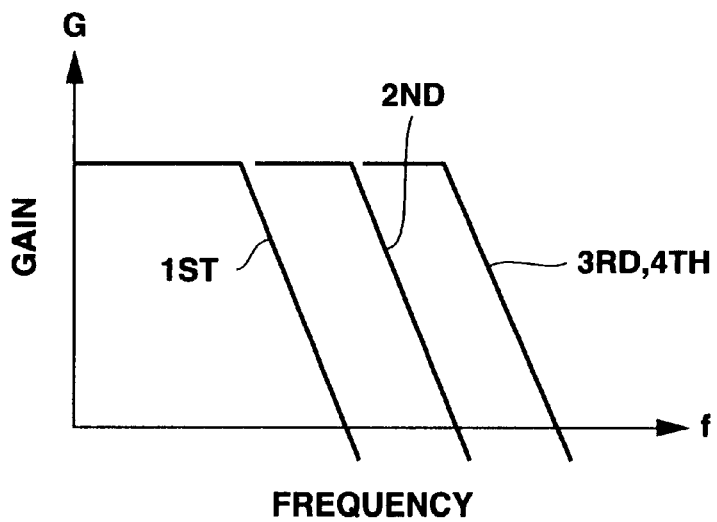
FIGS. 14A–14C are preprogrammed characteristic maps used in the arithmetic processing of FIG. 13.
Figure 14B:
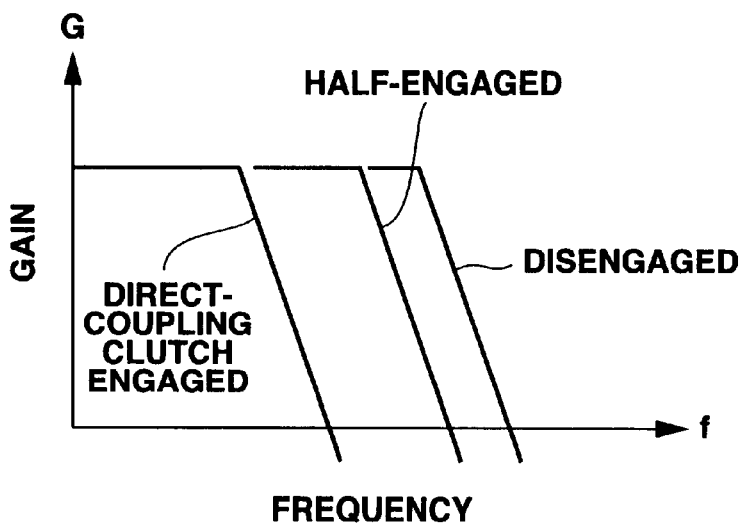
Figure 14C:
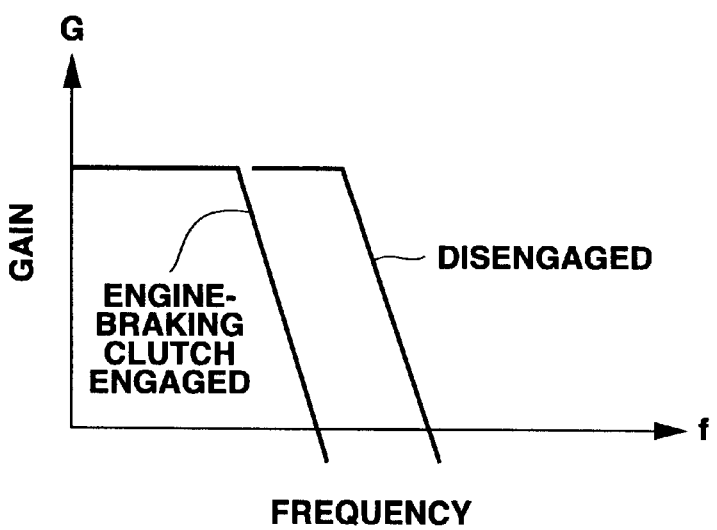

The setting of frequency characteristics of the low-pass filter (related to step S20 of FIG. 13) are hereunder described in detail in reference to frequency versus gain characteristic diagrams shown in FIGS. 14A, 14B, and 14C. As seen from the characteristic diagram shown in FIG. 14A, the frequency characteristic of the low-pass filter is set to be higher, as the transmission ratio (or the reduction ratio) of transmission 4 is reduced to a smaller value, for example from the lst speed gear to the 2nd speed gear, or from the 2nd speed gear to the 3rd speed gear, or from the 2nd speed gear to the 4th speed gear. This means that a frequency band of signals passing through the low-pass filter becomes higher with a decrease in the transmission ratio. In other words, the gain becomes greater, as the transmission ratio decreases. Generally, there is an increased tendency for the oscillation frequency of power-train torsional vibrations to become higher with a decrease in the transmission ratio of transmission 4. Therefore, when the frequency characteristic of the low-pass filter is properly variably set at a level substantially corresponding to the powertrain torsional vibration frequency according to the preprogrammed characteristic map of FIG. 14A, taking into account a change in the power-train torsional vibration frequency, arising from a change in the transmission ratio, it is possible to satisfactorily attenuate signals with a frequency corresponding to the power-train torsional vibrations. According to the frequency versus gain characteristic of FIG. 14A, the frequency characteristic of the low-pass filter can be suitably varied toward a higher frequency characteristic with a decrease in the transmission ratio. In other words, the gain can be varied or increased up to a relatively great value substantially corresponding to the frequency range of powertrain torsional vibrations. That is, a gain for the previously-noted average desired motor/generator torque $T^*_{M/G}@$ or a gain for the previously-noted desired motor/generator torque $T^*_{M/G}$ can be varied over a comparatively wide range, thus enabling the gain to be set at a higher level in comparison with the conventional system. Owing to the effectively increased gain, the system of the embodiment can easily rapidly achieve the average desired motor/generator torque $T^*_{M/G}@$ (or the desired motor/generator torque $T^*_{M/G}$). As a consequence, the motor/generator speed $N_{M/G}$ can smoothly rapidly reach a speed value substantially corresponding to the engine speed $N_E$. This ensures a rapid direct-coupling of the engine 1 with the motor/generator 2, thus enabling easier rapid vehicle starting. As seen from the characteristic diagram shown in FIG. 14B, the frequency characteristic of the low-pass filter is set to be higher, when the operating condition of direct-coupling clutch 36 is changed from the engaged state to the half-engaged state or changed from the half-engaged state to the disengaged state. This means that a frequency band of signals passing through the low-pass filter becomes higher with a transition from the engaged state to the half-engaged state or with a transition from the half-engaged state to the disengaged state. In other words, the gain becomes greater, as the operating condition of the direct-coupling clutch 36 is transferred from the engaged state via the half-engaged state to the disengaged state. Generally, there is an increased tendency for the oscillation frequency of power-train torsional vibrations to become higher with a transition of the operating condition of direct-coupling clutch 36 from the engaged state to the half-engaged state or with a transition of the operating condition of direct-coupling clutch 36 from the half-engaged state to the disengaged state. Therefore, when the frequency characteristic of the low-pass filter is properly variably set at a level substantially corresponding to the powertrain torsional vibration frequency according to the preprogrammed characteristic map of FIG. 14B, taking into account a change in the power-train torsional vibration frequency, arising from the transition of the operating condition of direct-coupling clutch 36 between the engaged state and the half-engaged state or from the transition of the operating condition of direct-coupling clutch 36 between the half-engaged state and the disengaged state, it is possible to effectively attenuate signals with a frequency corresponding to the power-train torsional vibrations. According to the frequency versus gain characteristic of FIG. 14B, the frequency characteristic of the low-pass filter can be suitably varied toward a higher frequency characteristic with a decrease in the engagement rate of direct-coupling clutch 36. The gain can be varied or increased up to a relatively great value substantially corresponding to the frequency range of powertrain torsional vibrations. That is, a gain for the previously-noted average desired motor/generator torque $T^*_{M/G}@$ or a gain for the previously-noted desired motor/generator torque $T^*_{M/G}$ can be varied over a comparatively wide range, thus enabling the gain to be set at a higher level in comparison with the conventional system. Owing to the effectively increased gain, the system of the embodiment can easily rapidly achieve the average desired motor/generator torque $T^*_{M/G}@$ (or the desiredmotor/generator torque $T^*_{M/G}$). As a consequence, the motor/generator speed $N_{M/G}$ can smoothly rapidly reach a speed value substantially corresponding to the engine speed $N_E$. This ensures a rapid direct-coupling of the engine 1 with the motor/generator 2, thus enabling easier rapidvehiclestarting. As seen from the characteristic diagram shown in FIG. 14C, the frequency characteristic of the low-pass filter is set to be higher, when the operating condition of the engine-braking clutch included in transmission 4 is changed from the engaged state to the disengaged state. This means that a frequency band of signals passing through the low-pass filter becomes higher with a transition from the engaged state to the disengaged state. In other words, the gain becomes greater, as the operating condition of the engine-braking clutch of transmission 4 is transferred from the engaged state to the disengaged state. Generally, there is an increased tendency for the oscillation frequency of power-train torsional vibrations to become higher with a transition of the operating condition of the engine-braking clutch of transmission 4 from the engaged state to the disengaged state. Thus, when the frequency characteristic of the low-pass filter is properly variably set at a level substantially corresponding to the powertrain torsional vibration frequency according to the preprogrammed characteristic map of FIG. 14C, taking into account a change in the power-train torsional vibration frequency, arising from the transition from the operating condition of the engine-braking clutch of transmission 4 between the engaged state and the disengaged state, it is possible to effectively attenuate signals with a frequency corresponding to the power-train torsional vibrations. According to the frequency versus gain characteristic of FIG. 14C, the frequency characteristic of the low-pass filter can be suitably varied toward a higher frequency characteristic with a decrease in the engagement rate of the engine-braking clutch of transmission 4. The gain can be varied or increased up to a relatively great value substantially corresponding to the frequency range of powertrain torsional vibrations. That is, a gain for the previously-noted average desired motor/generator torque $T^*_{M/G}@$ or a gain for the previously-noted desired motor/generator torque $T^*_{M/G}$ can be varied over a comparatively wide range, thus enabling the gain to be set at a higher level in comparison with the conventional system. Owing to the effectively increased gain, the system of the embodiment can easily rapidly achieve the average desired motor/generator torque $T^*_{M/G}@$ (or the desiredmotor/generatortorque $T^*_{M/G}$). As aconsequence, the motor/generator speed $N_{M/G}$ can smoothly rapidly reach a speed value substantially corresponding to the engine speed $N_E$. This ensures a rapid direct-coupling of the engine 1 with the motor/generator 2, thus enabling easier rapid vehicle starting.

Furthermore, in the system of the embodiment, which executes the routine shown in FIG. 13, the average throttle opening TH@ arithmetically calculated as the time mean of throttle opening data TH, is used to set or determine the desired motor/generator torque $T^*_{M/G}$. The use of the average throttle opening TH@ (the time mean of throttle opening data TH) is effective to suppress or prevent a rapid change in desired motor/generator torque $T^*_{M/G}$ even when a rapid change of the throttle opening TH occurs. This prevents a rapid change in motor/generator speed $N_{M/G}$ as well as a rapid change in motor/generator torque $T_{M/G}$, even in the presence of a rapid change in the throttle opening TH. That is, the use of the average throttle opening TH@ contributes to effective attenuation of powertrain torsional vibration frequency components. Additionally, in the system of the embodiment, which executes the routine shown in FIG. 13, the average engine speed $N_E@$ arithmetically calculated as the time mean of engine speed data $N_E$, is used to set or determine the desired motor/generator torque $T^*_{M,G}$. The use of the average engine speed $N_E@$ (the time mean of engine speed data NE) is effective to suppress or prevent a rapid change in desired motor/generator torque $T^*_{M/G}$, because the engine speed data $N_E$ can be effectively properly equalized and thus powertrain torsional vibration frequency components can be removed even when the engine speed $N_E$ undesiredly fluctuates or oscillates due to the powertrain torsional vibrations. This suppresses or prevents a rapid change in motor/generator speed $N_{M/G}$ as well as a rapid change in motor/generator torque $T_{m/G}$, even in the presence of engine speed fluctuations occurring owing to the powertrain vibrations. That is, the use of the average engine speed $N_E@$ contributes to effective attenuation of powertrain torsional vibration frequency components. Moreover, in the system of the embodiment, related to the routine shown in FIG. 11, in order to set or determine a final command value $T^*_{M/G}(LP)$, the low-pass filtering process is made to the desired motor/generator torque $T^*_{M/G}$ calculated. Also, in the system of the embodiment, related to the routine shown in FIG. 13, in order to set or determine a final command value $T^*_{M/G}@(LP)$, the low-pass filtering process is made to the average desired motor/generator torque $T^*_{M/G}@$ (corresponding to the time mean of desired motor/generator torque $T^*_{M/G}$). The low-pass filtering process is very effective to attenuate signals with powertrain torsional vibration frequency components. In the shown embodiment, the motor/generator controller 12 is comprised of a microcomputer. Instead of the microcomputer, various sorts of arithmetic and logic circuits may be used. In the shown embodiment, as shown in FIGS. 2, 3, 4A, 4B, 5, 6A, 6B, 7, 8A and 8B, the direct-coupling clutch 36 is disposed between the sun gear S of planetary gear system 21 (or the rotor 2R of motor/generator 2) and the output shaft of engine 1. In lieu thereof, for the purpose of directly coupling engine 1 with motor/generator 2, the direct-coupling clutch 36 may be disposed between the sun gear S of planetary gear system 21 and the planet-pinion carrier C. Alternatively, for the purpose of directly coupling engine 1 with motor/generator 2, the direct-coupling clutch 36 may be disposed between the planet-pinion carrier C of planetary gear system 21 and the ring gear R. It will be understood that a way to connect among three component parts (S, C, R) of planetary gear system 21, engine 1, motor/generator 2, and the output device such as transmission 4 is not limited to the particular embodiments shown and described herein, but that various changes and modifications may be made.

As will be appreciated from the above, in the parallel hybrid vehicle of the invention, a desired motor/generator torque is set or retrieved on the basis of both the throttle opening and engine speed, from a predetermined characteristic map. The signal indicative of the desired motor/generator torque is subjected to a low-pass filter that transmits signals at a frequency below a given cutoff frequency. The low-pass filtered output signal is used as a final desired motor/generator torque command value required to control the motor/generator torque output. That is, the desired motor/generator torque is determined based on both the engine speed and throttle opening in a fashion of feedforward processing, and thus the parallel hybrid system cannot be easily affected by powertrain torsional vibrations. The frequency band of signals passing through the low-pass filter is set to be somewhat lower than the powertrain torsional vibration frequency, thus effectively suppress undesired oscillations in motor/generator torque output and undesired oscillations in motor/generator speed. This enables the motor/generator to be smoothly rapidly driven, thus permitting the motor/generator to be smoothly rapidly brought into the direct-coupling state with the engine. Thus, an undesirable rise in engine speed can be suppressed during the vehicle starting period. As discussed above, the rate of change (the gradient of torque increase) in the desired motor/generator torque with respect to a change in engine speed corresponds to a gain of the desired motor/generator torque (see FIG. 12). Thus, by decreasingly compensating for the gradient of torque-increase within a predetermined speed range, it is possible to effectively reduce or suppress a response gain of the desired motor/generator torque with respect to the change in engine speed. Additionally, in the system of the invention, by virtue of the system time-lag effect of the low-pass filter, it is possible to effectively suppress a rapid change in the desired motor/generator torque (that is, undesirable oscillations in motor/generator torque) even in the presence of a rapid change in the throttle opening. This more effectively suppresses undesirable powertrain torsional vibrations. With the previously-discussed system construction of the invention, it is unnecessary to use a large capacity of car battery and a large electric motor/generator. This ensures down-sizing and lightening of the motor/generator and storage battery device, thus reducing total production costs of the system. Furthermore, the characteristic map of FIG. 12 is preprogrammed such that the engine torque output becomes greater than the desired motor/generator torque within a specified engine speed range ($N_E \leq N_{E0}$) below a predetermined engine speed ($N_{E0}$) which is set at a value substantially corresponding to an engine idle speed. By utilizing a torque-multiplication function based on a gear ratio of a planetary gear system constructing a torque composition mechanism of the motor/generator and engine, it is possible to produce the motor/generator torque output substantially corresponding to the engine torque output at low speeds. Therefore, even when the engine is running at low speeds, the combined torque of the torque outputs produced from the motor/generator and engine is sufficient to smoothly start and propel the vehicle, thus enabling the motor/generator to be smoothly directly coupled with the engine. This effectively suppresses a rapid rise in engine speed, thus suppressing the powertrain vibrations. The characteristic map of FIG. 12 is also preprogrammed such that the desired motor/generator torque reaches a value substantially corresponding to the engine torque output in another specified engine speed range ($N_{E1} \leq N_E \leq N_{E2}$) being set at engine speeds that permit the motor/generator to be smoothly directly coupled with the engine via the direct-coupling clutch after the vehicle starting. Thus, with no necessity torque matching between the torque output produced from the engine and the torque output produced from the motor/generator, the system of the invention can smoothly couple the motor/generator directly with the engine via the direct-coupling clutch within the specified engine speed range ($N_{E1} \leq N_E \leq N_{E2}$). Thereafter (in another specified speed range ($N_{E2} < N_E$) greater than the aforementioned specified engine speed range ($N_{E1} \leq N_E \leq N_{E2}$)), the system operates to accelerate the vehicle with a better acceleration feeling mainly by the torque output produced from the engine, while gradually reducing the torque output produced from the motor/generator. In this case, there is less torque difference between the engine torque output and the motor/generator torque output. Therefore, during the transition from the disengaged state of the direct-coupling clutch to the engaged state, the system of the invention insures the stable behavior of the vehicle. Also, in the specified engine speed range ($N_{E1} \leq N_E \leq N_{E2}$), the system permits the motor/generator to be directly coupled with the engine at the desired engine speed. Furthermore, the previously-noted characteristic map (see FIG. 12) is preprogrammed such that, at the same throttle opening (or at a specified throttle opening), the desired motor/generator torque becomes greater with an increase in engine speed and additionally the gradient of torque increase (the rate of torque increase) of the desired motor/generator torque becomes smaller with the increase in engine speed. That is, the gain of the desired motor/generator torque ($T^*_{M/G}$) to engine speed becomes smaller in a high engine speed range. As a consequence, the response of the motor/generator, obtainable in a low engine speed range, becomes higher, thus enabling the motor/generator to be rapidly coupled directly with the engine. The direct-coupling timing advancement of the motor/generator with the engine suppresses a rapid rise in engine speed, and consequently suppresses powertrain vibrations. Also, according to the characteristic map of FIG. 12, the rate of increase in torque output produced from the motor/generator tends to decrease in the high engine speed range, so that the motor/generator torque output characteristic smoothly approaches to the engine torque output characteristic. Moreover, according to the parallel hybrid system of the parallel hybrid vehicle of the invention, a frequency characteristic of the low-pass filter is set to be higher with a decrease in a reduction ratio (a transmission ratio) of the transmission (see FIG. 14A). Under a condition in which the transmission ratio is small and thus the oscillation frequency of powertrain vibrations is high, the response of the motor/generator can be enhanced toward within a high engine speed range. This contributes to a smooth rapid direct coupling of the motor/generator with the engine. Additionally, a frequency characteristic of the low-pass filter is set to be higher in the presence of transition from the engaged state of the engine-braking clutch to the disengaged state (see FIG. 14C). Under a condition in which the engine-braking clutch of the transmission is shifted from the engaged state to the disengaged state and thus the oscillation frequency of powertrain vibrations is high, the response of the motor/generator can be enhanced toward within a high engine speed range. This contributes to a smooth rapid direct coupling of the motor/generator with the engine. Additionally, a frequency characteristic of the low-pass filter is set to be higher in the presence of transition from the engaged state of the direct-coupling clutch via the half-engaged state to the disengaged state (see FIG. 14B). Under a condition in which the direct-coupling clutch is shifted from the engaged state via the half-engaged state to the disengaged state and thus the oscillation frequency of powertrain vibrations is high, the response of the motor/generator can be enhanced toward within a high engine speed range. This contributes to a smooth rapid direct coupling of the motor/generator with the engine. Preferably, the parallel hybrid system of the parallel hybrid vehicle of the invention uses a time mean ($N_E@$) of engine speed data to set the desired motor/generator torque, thereby effectively removing or attenuating powertrain torsional vibration frequency components. Preferably, the parallel hybrid system of the parallel hybrid vehicle of the invention uses a time mean ($TH@$) of throttle opening data to set the desired motor/generator torque, thereby effectively removing or attenuating powertrain torsional vibration frequency components. More preferably, within the parallel hybrid system of the parallel hybrid vehicle of the invention, a time mean ($T^*_{M/G}@$) of desired motor/generator torque data is subjected to a preprogrammed low-pass filtering process, and then the low-pass filtered desired motor/generator torque ($T^*_{M/G}$@ (LP)) is used as a final motor/generator torque command value (a torque control signal for the motor/generator), thereby more effectively removing or attenuating the powertrain torsional vibration frequency components, and thus more remarkably suppressing or reducing undesirable amplification of the powertrain vibrations.

The entire contents of Japanese Patent Application No. P2000-062461 (filed Mar. 7, 2000) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A parallel hybrid vehicle employing a parallel hybrid system, using both an internal combustion engine and an electric motor generator for propulsion, said parallel hybrid vehicle comprising:
    a torque composition mechanism which combines a torque output produced by the engine and a torque output produced by the motor generator to generate a combined torque, and which is connected via a transmission in a powertrain to drive wheels to output the combined torque via the transmission to the drive wheels;
    a direct-coupling clutch which directly couples the engine with the motor generator;
    an engine-speed sensor which detects engine speed of the engine;
    a throttle opening sensor which detects a throttle opening of a throttle valve;
    a controller being connected electrically to the motor generator and the direct-coupling clutch for controlling the torque output produced by the motor generator and engagement and disengagement of the direct-coupling clutch, said controller allowing the direct-coupling clutch to operate in a disengaged state and allowing the engine speed to be maintained at a predetermined value during starting of the vehicle;
    said controller comprising:
        (a) a desired motor/generator torque setting section which sets a desired motor/generator torque on the basis of both the engine speed and the throttle opening from a predetermined characteristic map to generate a signal indicative of the desired motor/generator torque, and
        (b) a response-characteristic compensation section which attenuates high-input-frequency components and passes low-input-frequency components, out of the signal indicative of the desired motor/generator torque set through the desired motor/generator torque setting section, to generate a compensated signal; and
    said controller controlling the torque output of the motor generator on the basis of a signal value of the compensated signal generated by the response-characteristic compensation section.

2. The parallel hybrid vehicle as claimed in claim 1, wherein the response-characteristic compensation section comprises either of a low-pass filter that passes signals at a frequency below a predetermined cut-off frequency and attenuates signals with a frequency above the predetermined cut-off frequency, and an integrator that produces a low gain at the high-input-frequency components and produces a high gain at the low-input-frequency components.

3. The parallel hybrid vehicle as claimed in claim 1, wherein the predetermined characteristic map is preprogrammed so that the torque output produced from the engine is greater than the desired motor/generator torque in a specified engine speed range below a predetermined engine speed which is set at a value substantially corresponding to an idle speed of the engine.

4. The parallel hybrid vehicle as claimed in claim 1, wherein the predetermined characteristic map is preprogrammed so that the desired motor/generator torque reaches a value substantially corresponding to the torque output produced from the engine in a specified engine speed range which is set at engine speeds that permit the motor generator to be directly coupled with the engine via the direct-coupling clutch after the starting of the vehicle.

5. The parallel hybrid vehicle as claimed in claim 1, wherein the predetermined characteristic map is preprogrammed so that, at a specified throttle opening of the throttle valve, the desired motor/generator torque is set to be greater with an increase in the engine speed and a rate of increase in the desired motor/generator torque is smaller with the increase in the engine speed.

6. The parallel hybrid vehicle as claimed in claim 2, wherein the predetermined characteristic map is preprogrammed so that the torque output produced from the engine is greater than the desired motor/generator torque in a specified engine speed range below a predetermined engine speed which is set at a value substantially corresponding to an idle speed of the engine.

7. The parallel hybrid vehicle as claimed in claim 2, wherein the predetermined characteristic map is preprogrammed so that the desired motor/generator torque reaches a value substantially corresponding to the torque output produced from the engine in a specified engine speed range which is set at engine speeds that permit the motor generator to be directly coupled with the engine via the direct-coupling clutch after the starting of the vehicle.

8. The parallel hybrid vehicle as claimed in claim 2, wherein the predetermined characteristic map is preprogrammed so that, at a specified throttle opening of the throttle valve, the desired motor/generator torque is set to be greater with an increase in the engine speed and a rate of increase in the desired motor/generator torque is smaller with the increase in the engine speed.

9. The parallel hybrid vehicle as claimed in claim 2, wherein, when the response-characteristic compensation section comprises the low-pass filter, the controller comprises a low-pass filter setting section which sets a frequency characteristic of the low-pass filter, the low-pass filter setting section being responsive to a reduction ratio of the transmission so as to set the frequency characteristic of the low-pass filter at a higher level with a decrease in the reduction ratio.

10. The parallel hybrid vehicle as claimed in claim 2, wherein, the transmission comprises an engine-braking clutch which enables a back driving torque input from a road surface to the drive wheels to be transmitted to the torque composition mechanism via the engine-braking clutch engaged, and when the response-characteristic compensation section comprises the low-pass filter, the controller comprises a low-pass filter setting section which sets a frequency characteristic of the low-pass filter, the low-pass filter setting section being responsive to a transition between an engaged state of the engine-braking clutch and a disengaged state of the engine-braking clutch so as to set the frequency characteristic of the low-pass filter at a higher level in presence of a transition from the engaged state of the engine-braking clutch to the disengaged state and to set the frequency characteristic of the low-pass filter at a lower level in presence of a transition from the disengaged state of the engine-braking clutch to the engaged state.

11. The parallel hybrid vehicle as claimed in claim 2, wherein, when the response-characteristic compensation section comprises the low-pass filter, the controller comprises a low-pass filter setting section which sets a frequency characteristic of the low-pass filter, the low-pass filter setting section being responsive to a transition between an engaged state of the direct-coupling clutch and a disengaged state of the direct-coupling clutch so as to set the frequency characteristic of the low-pass filter at a higher level in presence of a transition from the engaged state of the direct-coupling clutch to the disengaged state, and to set the frequency characteristic of the low-pass filter at a lower level in presence of a transition from the disengaged state of the direct-coupling clutch to the engaged state.

12. The parallel hybrid vehicle as claimed in claim 1, wherein the desired motor/generator torque setting section calculates a time mean of input information data indicative of the engine speed detected by the engine speed sensor, for setting the desired motor/generator torque based on the time mean of input information data indicative of the engine speed.

13. The parallel hybrid vehicle as claimed in claim 1, wherein the desired motor/generator torque setting section calculates a time mean of input information data indicative of the throttle opening detected by the throttle opening sensor, for setting the desired motor/generator torque based on the time mean of input information data indicative of the throttle opening.

14. The parallel hybrid vehicle as claimed in claim 1, wherein the desired motor/generator torque setting section calculates a time mean of the desired motor/generator torque to produce a signal indicative of the time mean of the desired motor/generator torque, and produces a compensated motor/generator torque command by passing the signal indicative of the time mean of the desired motor/generator torque through the response-characteristic compensation section, and the controller controls the torque output of the motor generator in response to the compensated motor/generator torque command.

15. A parallel hybrid vehicle employing a parallel hybrid system, using both an internal combustion engine and an electric motor generator for propulsion, said parallel hybrid vehicle comprising:

a torque composition means including a differential system for combining a torque output produced by the engine and a torque output produced by the motor generator to generate a combined torque, said torque composition means connected via a transmission in a powertrain to drive wheels for outputting the combined torque via the transmission to the drive wheels;

a direct-coupling clutch which directly couples the engine with the motor generator;

an engine-speed sensor means for detecting engine speed of the engine;

a throttle opening sensor means for detecting a throttle opening of a throttle valve;

a torque control means connected electrically to the motor generator and the direct-coupling clutch for controlling the torque output produced by the motor generator and engagement and disengagement of the direct-coupling clutch, said torque control means allowing the direct-coupling clutch to operate in a disengaged state and allowing the engine speed to be maintained at a predetermined value and allowing the direct-coupling clutch to engage at a timing when the engine speed synchronizes a rotational speed of the motor generator during starting of the vehicle;

said torque control means comprising:
(a) a desired motor/generator torque setting means for setting a desired motor/generator torque on the basis of both the engine speed and the throttle opening from a predetermined characteristic map to generate a signal indicative of the desired motor/generator torque, and
(b) a response-characteristic compensating means for attenuating high-input-frequency components and for passing low-input-frequency components, out of the signal indicative of the desired motor/generator torque set through the desired motor/generator torque setting means, to generate a compensated signal; and said torque control means controlling the torque output of the motor generator on the basis of a signal value of the compensated signal generated by the response-characteristic compensating means.

16. The parallel hybrid vehicle as claimed in claim 15, wherein, the response-characteristic compensating means comprises the low-pass filter, and the controller comprises a low-pass filter setting section which sets a frequency characteristic of the low-pass filter, the low-pass filter setting section being responsive to a reduction ratio of the transmission so as to set the frequency characteristic of the low-pass filter at a higher level with a decrease in the reduction ratio.

17. The parallel hybrid vehicle as claimed in claim 15, wherein, the transmission comprises an engine-braking clutch which enables a back driving torque input from a road surface to the drive wheels to be transmitted to the torque composition mechanism via the engine-braking clutch engaged, and when the response-characteristic compensating means comprises the low-pass filter, the controller comprises a low-pass filter setting section which sets a frequency characteristic of the low-pass filter, the low-pass filter setting section being responsive to a transition between an engaged state of the engine-braking clutch and a disengaged state of the engine-braking clutch so as to set the frequency characteristic of the low-pass filter at a higher level in presence of a transition from the engaged state of the engine-braking clutch to the disengaged state and to set the frequency characteristic of the low-pass filter at a lower level in presence of a transition from the disengaged state of the engine-braking clutch to the engaged state.

18. An electronic control method for a parallel hybrid vehicle employing a parallel hybrid system, using both an internal combustion engine and an electric motor generator for propulsion and including a direct-coupling clutch directly coupling the engine with the motor generator, and an engine-braking clutch incorporated in a transmission in a powertrain, the electronic control method comprising:

detecting a throttle opening of a throttle valve;
calculating an average throttle opening as a time mean of the throttle opening;
detecting engine speed of the engine;
calculating an average engine speed as a time mean of the engine speed;
retrieving a desired motor/generator torque of the motor generator on the basis of the average throttle opening and the average engine speed from a predetermined characteristic map to produce a signal indicative of the desired motor/generator torque;

calculating an average desired motor/generator torque as a time mean of the desired motor/generator torque;

detecting a reduction ratio of the transmission in the powertrain;

detecting input information regarding which state the direct-coupling clutch is in;

detecting input information regarding which state the engine-braking clutch is in;

selecting a response-characteristic-compensator frequency characteristic responsively to the reduction ratio of the transmission, the input information regarding which state the direct-coupling clutch is in, and the input information regarding which state the engine-braking clutch is in;

making a response-characteristic compensating process of the selected response-characteristic-compensator frequency characteristic to the signal indicative of the average desired motor/generator torque to generate a compensated motor/generator torque command; and controlling the motor generator in response to the compensated motor/generator torque command.

19. The method as claimed in claim 18, wherein the response-characteristic-compensator frequency characteristic is set at a higher level with a decrease in the reduction ratio of the transmission.

20. The method as claimed in claim 18, wherein the response-characteristic-compensator frequency characteristic is set at a higher level in presence of a transition from an engaged state of the engine-braking clutch to a disengaged state and set at a lower level in presence of a transition from the disengaged state of the engine-braking clutch to the engaged state, and wherein the response-characteristic-compensator frequency characteristic is set at a higher level in presence of a transition from an engaged state of the direct-coupling clutch to a disengaged state and set at a lower level in presence of a transition from the disengaged state of the direct-coupling clutch to the engaged state.

* * * * *